United States Patent [19]
Shimomura et al.

[11] Patent Number: 5,838,596
[45] Date of Patent: Nov. 17, 1998

[54] SIMULATION SYSTEM FOR CONTROL SEQUENCE FOR SHEET TRANSPORTATION

[75] Inventors: Yoshiki Shimomura; Sadao Tanigawa; Kazuhiro Ogawa; Hirofumi Nishino; Kenji Katsuhara; Toshimitsu Takakura, all of Osaka; Tetsuo Tomiyama, Tokyo; Yasushi Umeda, Tama; Tomohiko Sakao, Tokyo, all of Japan

[73] Assignee: Mita Industrial Co., Ltd., Osaka, Japan

[21] Appl. No.: 856,087

[22] Filed: May 14, 1997

[30] Foreign Application Priority Data

May 21, 1996 [JP] Japan ................................... 8-126159

[51] Int. Cl.$^6$ .......................... G06F 9/455; G03G 21/00
[52] U.S. Cl. .................. 364/578; 395/406; 395/183.02; 395/920; 399/18; 399/42; 399/46
[58] Field of Search ..................... 364/578, 580, 364/478.01, 478.16, 478.17; 271/264, 265.01, 266; 355/407, 408, 204, 205; 358/488, 498; 395/406, 183.02, 183.13, 920; 399/10, 16, 18, 42, 46, 77, 361, 370, 371

[56] References Cited

U.S. PATENT DOCUMENTS

| | | | |
|---|---|---|---|
| 3,946,669 | 3/1976 | Johne et al. | 101/230 |
| 4,104,726 | 8/1978 | Fisk et al. | 364/518 |
| 4,521,847 | 6/1985 | Ziehm et al. | 364/184 |
| 5,010,551 | 4/1991 | Goldsmith et al. | 371/16.4 |
| 5,018,718 | 5/1991 | Matsuno et al. | 271/245 |
| 5,053,815 | 10/1991 | Wendell | 355/208 |
| 5,301,336 | 4/1994 | Kodosky et al. | 395/800 |
| 5,313,253 | 5/1994 | Martin et al. | 355/205 |
| 5,337,248 | 8/1994 | Eckert, Jr. et al. | 364/468 |
| 5,502,544 | 3/1996 | Carolan | 355/204 |
| 5,623,713 | 4/1997 | Shimomura et al. | 399/42 |

FOREIGN PATENT DOCUMENTS

| | | |
|---|---|---|
| 0 259 144 | 3/1988 | European Pat. Off. . |
| 0 476 681 | 3/1992 | European Pat. Off. . |
| 478338 | 4/1992 | European Pat. Off. . |
| 0 583 928 | 2/1994 | European Pat. Off. . |
| 4-130331 | 5/1992 | Japan . |

OTHER PUBLICATIONS

Patent Abstracts of Japan vol. 10, No. 157(P–464), Jun. 6, 1986 & JP 61 009667, Jan. 17, 1986.
Patent Abstracts of Japan vol. 011, No. 098 (M–575), Mar. 27, 1987 & JP 61 248838, Nov. 6, 1986.
Patent Abstracts of Japan, Mita Ind. Co. Ltd., Application No. 02252112, filed Sep. 21, 1990.
Kergosien et al., "Bending and Creasing Virtual Paper", IEEE Computer Graphics & Applications, Jan. 1994, pp. 40–48.

*Primary Examiner*—Kevin J. Teska
*Assistant Examiner*—Russell W. Frejd
*Attorney, Agent, or Firm*—Beveridge, DeGrandi, Weilacher & Young, LLP

[57] ABSTRACT

A simulation system is provided which is capable of simulating the behavior of a sheet transported by a transportation system. In response to application of a control sequence formulated for the sheet transportation system, a simulation is performed to check how the sheet is to be transported in the sheet transportation system on the basis of the applied control sequence. Necessary data are extracted from hardware systems constituting the real sheet transportation system. On the basis of the extracted data, a virtual sheet transportation system is constructed in a computer, and the sheet is represented by information indicative of the locations of opposite ends of the sheet and the distance therebetween. The sheet thus represented is moved by a predetermined unit distance in the virtual sheet transportation system on the basis of the control sequence, and data is computed for every movement of the sheet.

6 Claims, 37 Drawing Sheets

F I G. 2
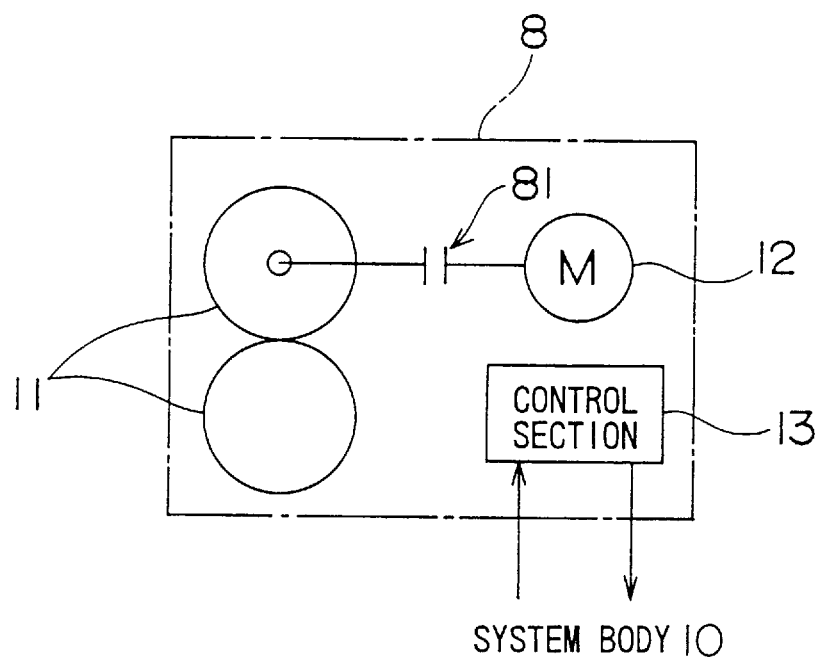

F I G. 5

SENSOR ADDRESS

| COORDINATES | (Sx1, Sy1) |
|---|---|
| STATUS | SENSOR TYPE 1 |

BRIDGE 1

| CONNECTION POINTS | Add2, Add3 |
|---|---|
| CONNECTION FORM | R 3 0 |
| HEIGHT | 5 mm |

UNIT ADDRESS 1

| COORDINATES | (Ux1, Uy1) |
|---|---|
| STATUS | PAPER SUPPLY UNIT |

UNIT ADDRESS 2

| COORDINATES | (Ux2, Uy2) |
|---|---|
| STATUS | PAPER FEED UNIT |

UNIT ADDRESS 3

| COORDINATES | (Ux3, Uy3) |
|---|---|
| STATUS | NO UNIT |

F I G. 6
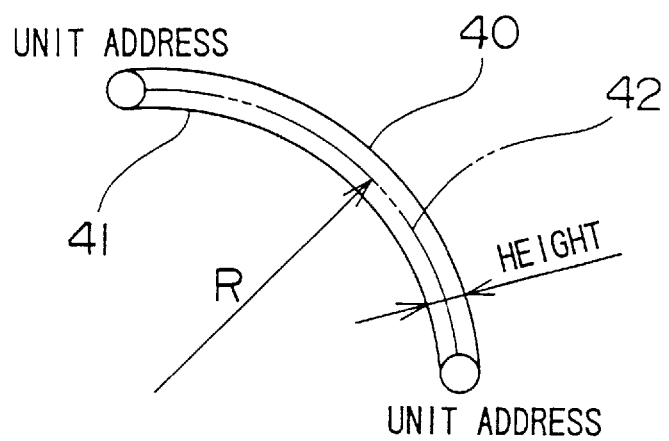

F I G. 7
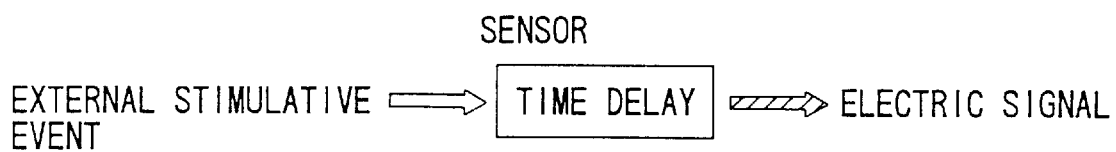

FIG. 8

| DESIGNATION | SENSOR TYPE 1 | |
|---|---|---|
| | ACTION 1 | ACTION 2 |
| STIMULATIVE EVENT | PAPER EXIST | NO PAPER |
| TIME DELAY | X(ms) | XX(ms) |
| OUTPUT | H DIGITAL SIGNAL | L DIGITAL SIGNAL |

F I G. 10A
| DESIGNATION | HEAD POINT 1 |
|---|---|
| REAL SPEED | 1 2 0 |
F I G. 10B
| DESIGNATION | UNIT POINT 1 |
|---|---|
| MODE | DRIVING/FREE |
| UNIT | SHEET SUPPLY UNIT 1 |
| REAL SPEED | 3 0 0 |
| | |
F I G. 11
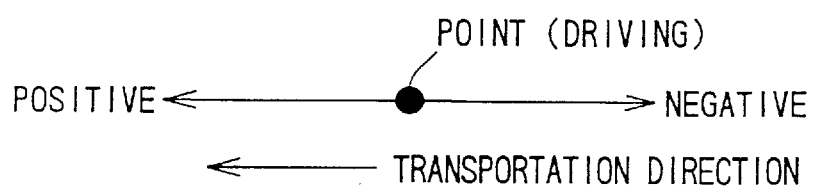

F I G. 12
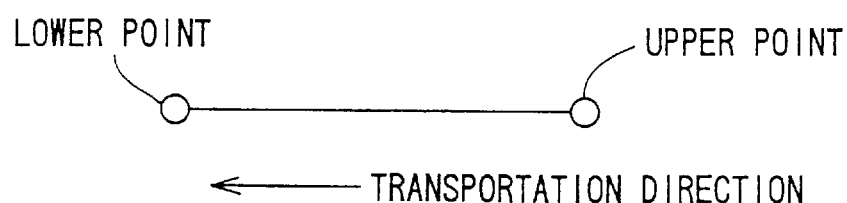
F I G. 13
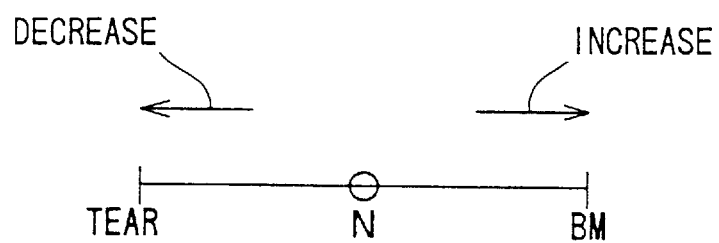

FIG. 14

| LOWER POINT | | UPPER POINT | | TVlower vs TVupper | IState | RVlower RVupper |
|---|---|---|---|---|---|---|
| MODE | STATE | MODE | STATE | | | |
| DRIVING | State1-3 | DRIVING | State1-3 | TVlower > TVupper | [TEAR,N],N →decrease | TVlower > RVlower=RVupper > TVupper |
| | | | | | [N,BM] →decrease | RVlower = TVlower>RVupper = TVupper |
| | | | | TVlower < TVupper | [TEAR,N],N,[N,BM] →increase | RVlower = TVlower<RVupper = TVupper |
| | | | | TVlower = TVupper | [TEAR,N],N,[N,BM] →keep | RVlower = TVlower=RVupper = TVupper |
| FREE (H/T) | | DRIVING | State1-3 | / | [TEAR,N],N,[N,BM] →Normal | TVupper = RVlower=RVupper |
| DRIVING | State1-3 | FREE (H/T) | | / | [TEAR,N],N,[N,BM] →Normal | TVlower = RVlower=RVupper |
| FREE (H/T) | | FREE (H/T) | | / | [TEAR,N],N,[N,BM] →Normal | RVlower = RVupper = 0 |

F I G. 15A
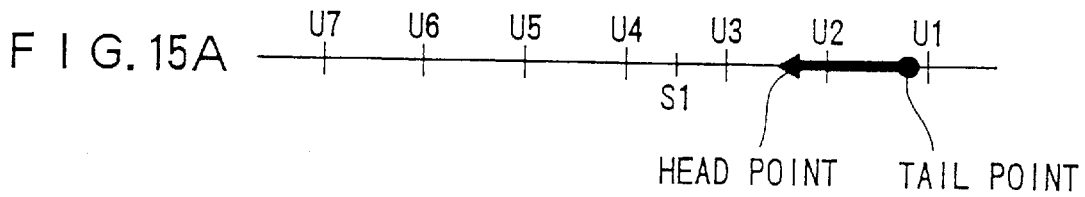
F I G. 15B
| U 7 − U 6 | 2 0 mm |
| U 6 − U 5 | 6 0 mm |
| U 5 − U 4 | 2 1 0 mm |
| | | |
F I G. 15C
| DESIGNATION | INTERVAL |
| UPPER POINT | (POINT NAME) |
| LOWER POINT | (POINT NAME) |
| I STATE | [TEAR, NORMAL] |
F I G. 15D
| DESIGNATION | A4R STANDERD |
| HEAD POINT | (POINT NAME) |
| TAIL POINT | (POINT NAME) |
| FRICTION COEFFICIENT | 0. 2 |
| LENGTH | 2 1 0 mm |

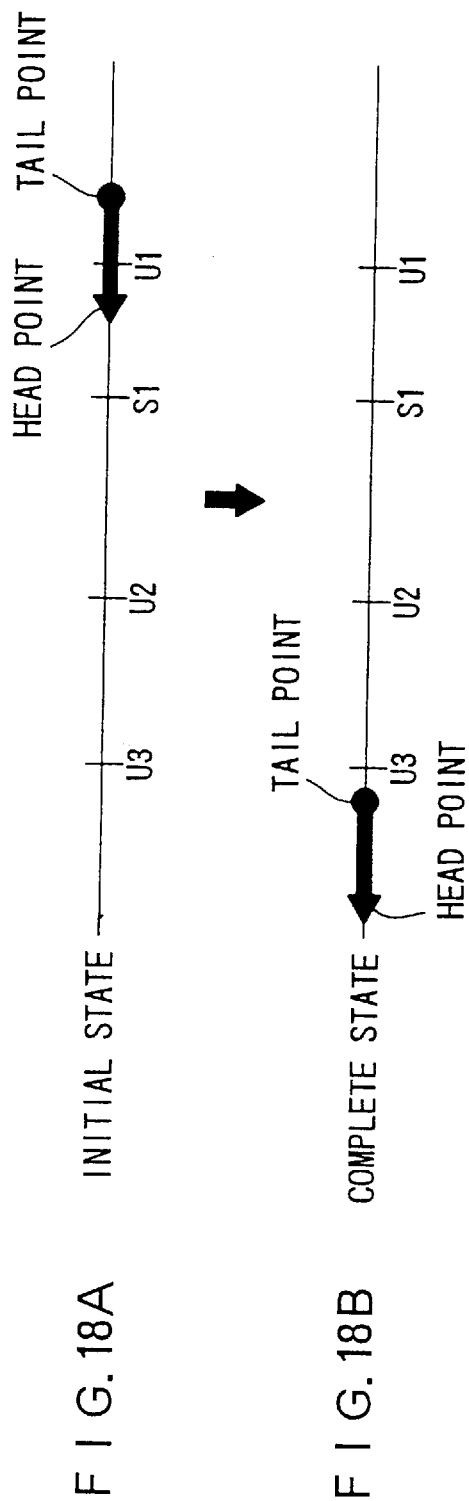

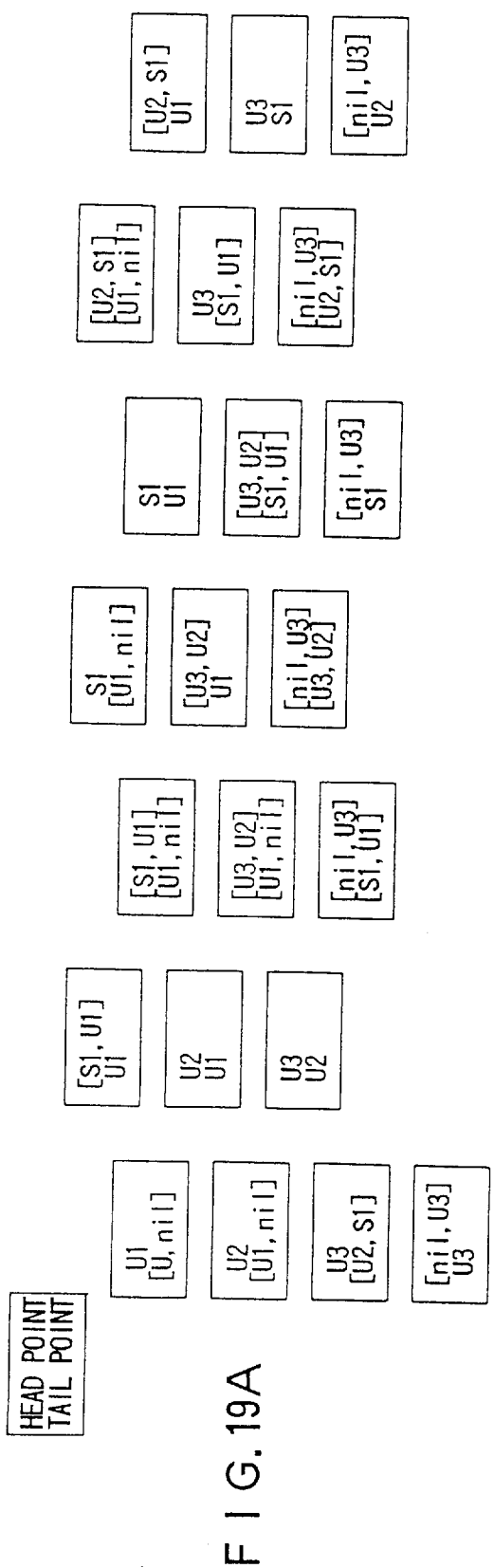
F I G. 19A
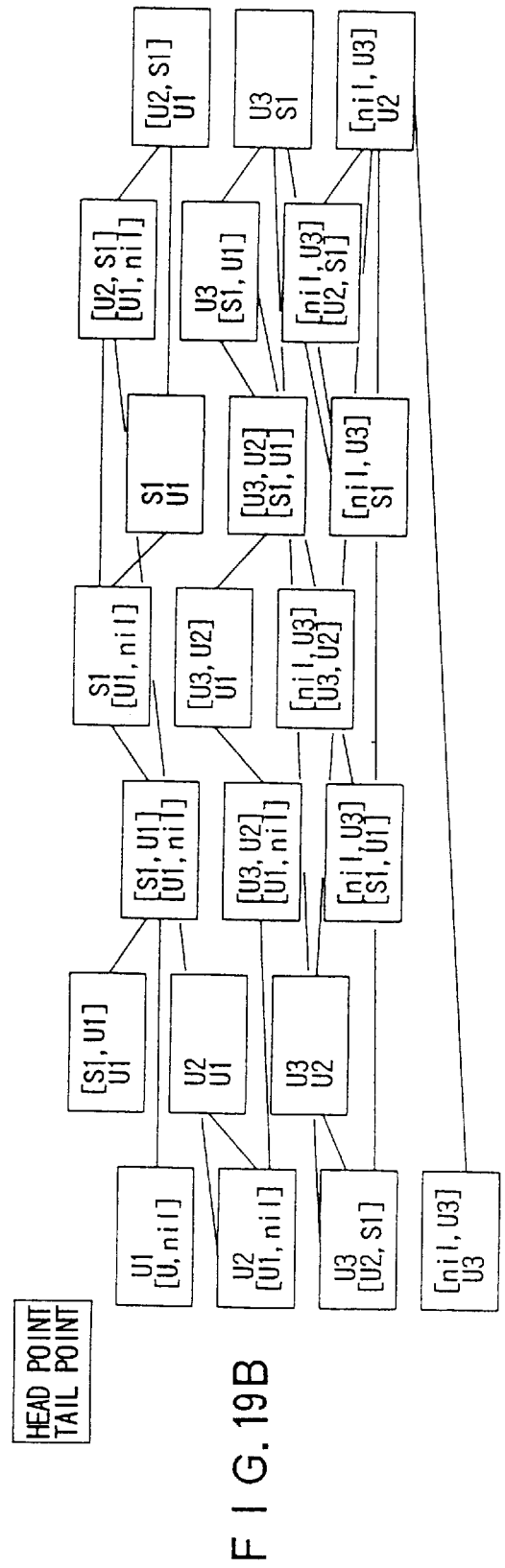
F I G. 19B

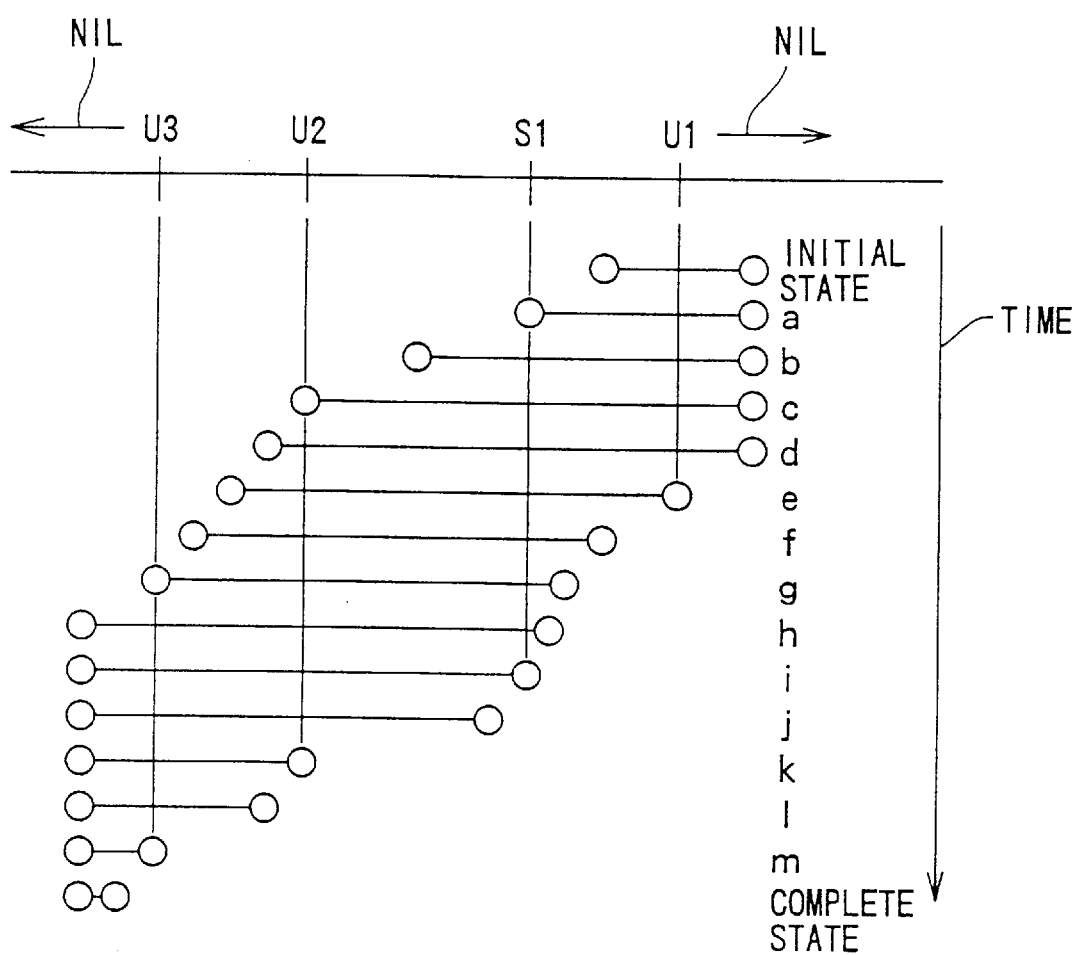

F I G. 22A
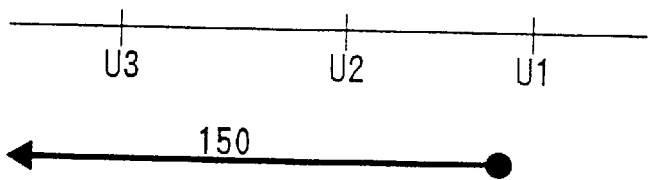
F I G. 22B
| U1 − U2 | 5 0 |
|---|---|
| U2 − U3 | 7 0 |

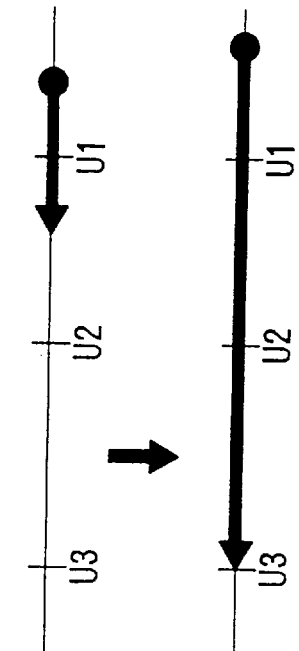
FIG. 23A INITIAL STATE
FIG. 23B COMPLETE STATE

F I G. 26
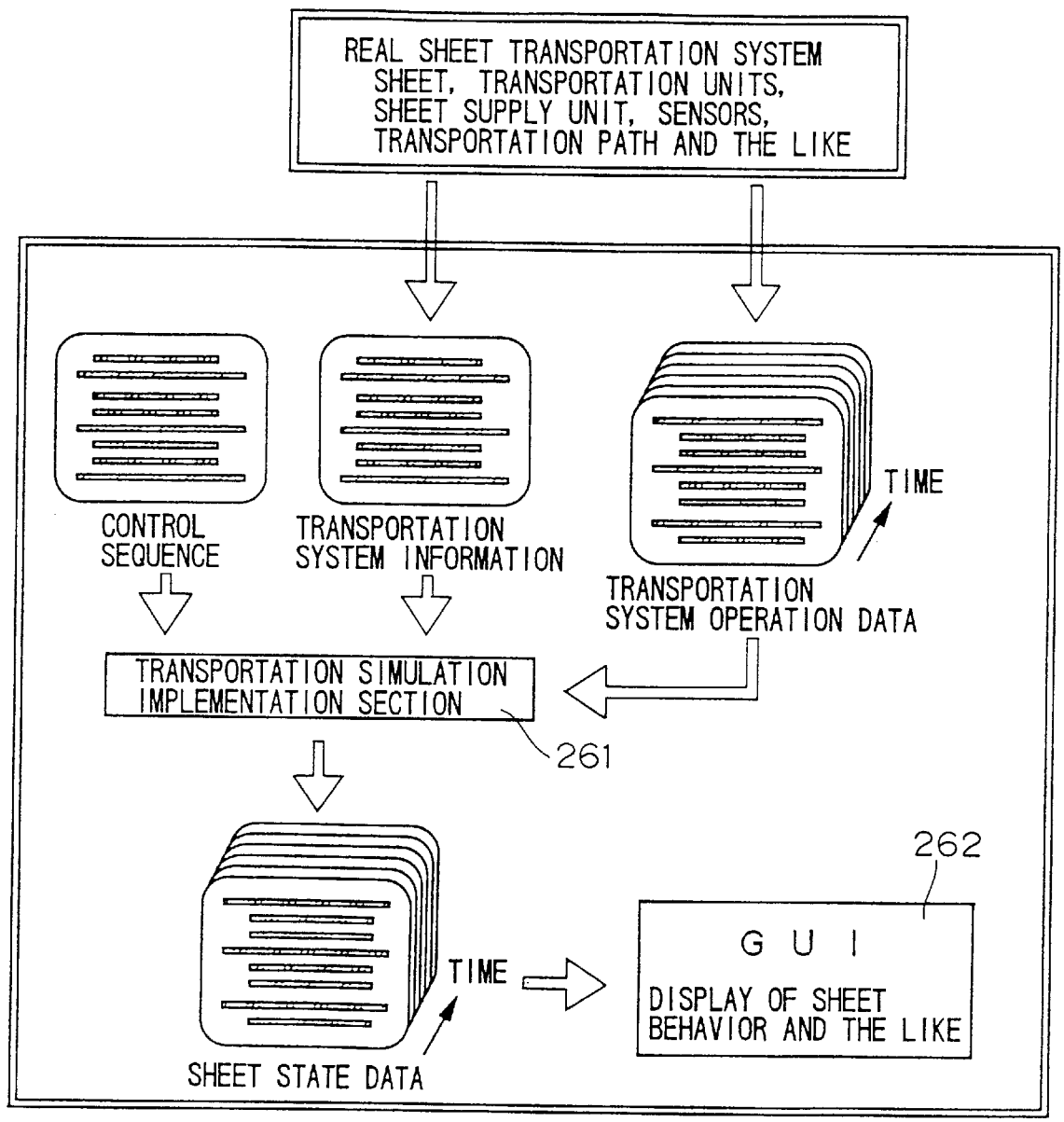

F I G. 27
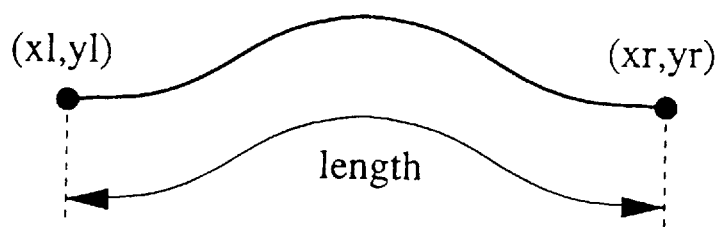

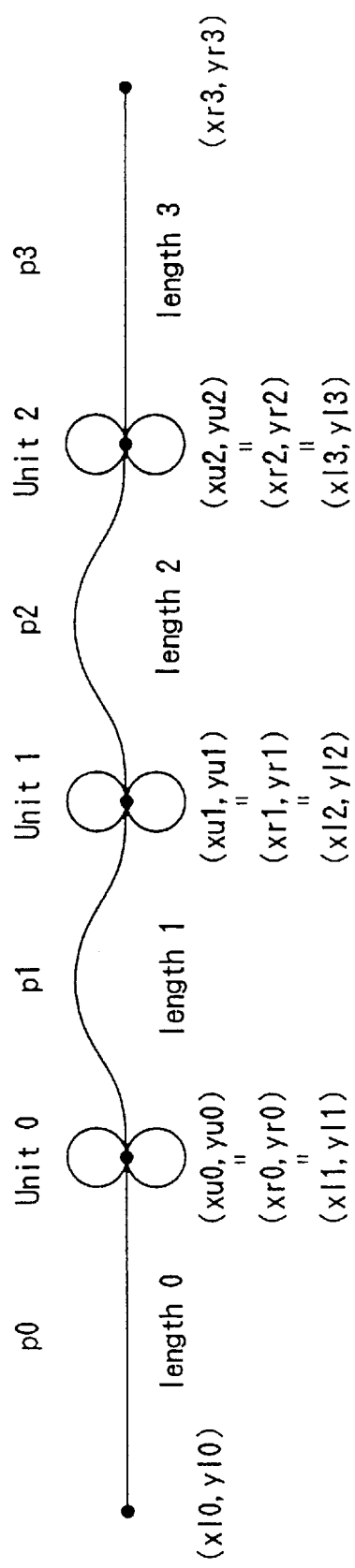
F I G. 28

F I G. 29
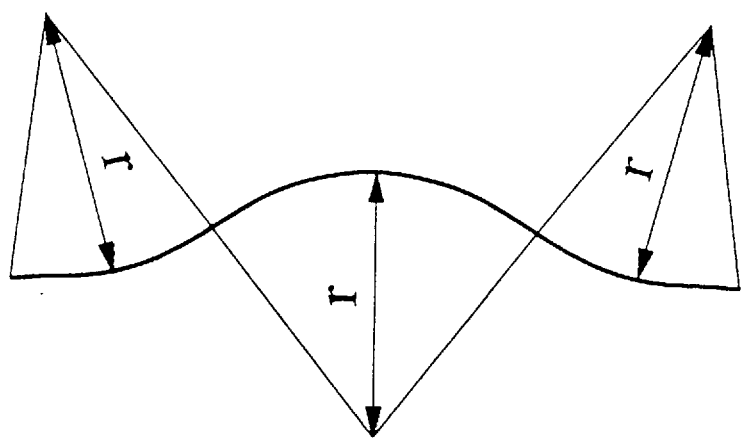

F I G. 32
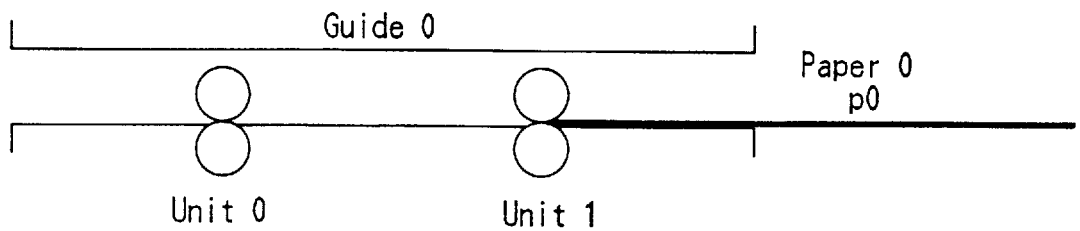
INFORMATION OF Guide 0
HEIGHT g_height
INFORMATION OF Unit 0
  COORDINATES OF
  OPERATION POINT(xu0, yu0)
  FUNCTION OF OPERATION
  POINT handling 0 ( )
INFORMATION OF Unit 1
  COORDINATES OF
  OPERATION POINT(xu1, yu1)
  FUNCTION OF OPERATION
  POINT handling 1 ( )
INFORMATION OF Paper 0
  BASIC MODEL : p0
  INFORMATION OF p0
  COORDINATES OF OPPOSITE ENDS (xl0, yl0) (xr0, yr0)
  LENGTH length 0

F I G. 33
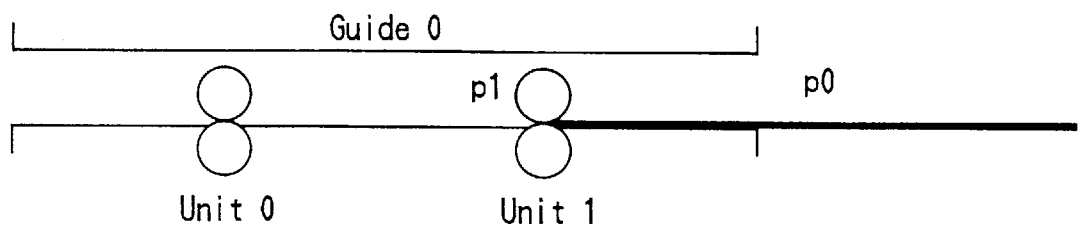
```
INFORMATION OF Paper 0
  BASIC MODELS : p0, p1
    INFORMATION OF p0
      COORDINATES OF OPPOSITE ENDS
        (x10=xu1, y10=yu1)(xr0, yr0)
      LENGTH length 0
      ACTION handling 1 ( )
      FLEXURE HEIGHT LIMIT g_height
    INFORMATION OF p1
      COORDINATES OF OPPOSITE ENDS
        (x11=xu1, y11=yu1)(xr1=xu1, yr1=yu1)
      LENGTH length 1 = 0
      ACTION handling 1 ( )
      FLEXURE HEIGHT LIMIT g_height
```

```
INFORMATION OF Paper 0
  BASIC MODELS : p0,p1
     INFORMATION OF p0 = handling 1 (INFORMATION OF p0)
     INFORMATION OF p1 = handling 1 (INFORMATION OF p1)
```

F I G. 35

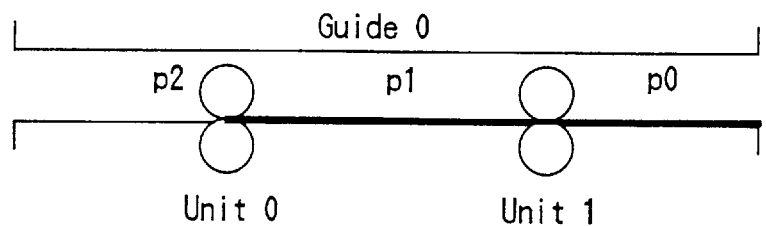

```
INFORMATION OF Paper 0
  BASIC MODELS : p0, p1, p2
    INFORMATION OF p0
      COORDINATES OF OPPOSITE ENDS
        (x10=xu1, y10=yu1)(xr0, yr0)
      LENGTH length 0
      ACTION handling 1 ( )
      FLEXURE HEIGHT LIMIT g_height
    INFORMATION OF p1
      COORDINATES OF OPPOSITE ENDS
        (x11=xu0, y11=yu0)(xr1=xu1, yr1=yu1)
      LENGTH length 1
      ACTION handling 0 ( )
      ACTION handling 1 ( )
      FLEXURE HEIGHT LIMIT g_height
    INFORMATION OF p2
      COORDINATES OF OPPOSITE ENDS
        (x12=xu0, y12=yu0)(xr2=xu0, yr2=yu0)
      LENGTH length 2 = 0
      ACTION handling 0 ( )
      FLEXURE HEIGHT LIMIT g_height
```

```
INFORMATION OF Paper 0
  BASIC MODELS : p0, p1, p2
     INFORMATION OF p0 = handling 1 (INFORMATION OF p0)
     INFORMATION OF p1 = handling 0 (INFORMATION OF p1)
     INFORMATION OF p1 = handling 1 (INFORMATION OF p1)
     INFORMATION OF p2 = handling 0 (INFORMATION OF p2)
```

```
INFORMATION OF Paper 0
  BASIC MODELS : p1, p2
    INFORMATION OF p1
      COORDINATES OF OPPOSITE ENDS
        (x11=xu0, y11=yu0)(xr1, yr1)
      LENGTH length 1
      ACTION handling 0 ( )
      FLEXURE HEIGHT LIMIT g_height
    INFORMATION OF p2
      COORDINATES OF OPPOSITE ENDS
        (x12, y12)(xr2=xu0, yr2=yu0)
      LENGTH length 2
      ACTION handling 0 ( )
      FLEXURE HEIGHT LIMIT g_height
```

F I G. 38
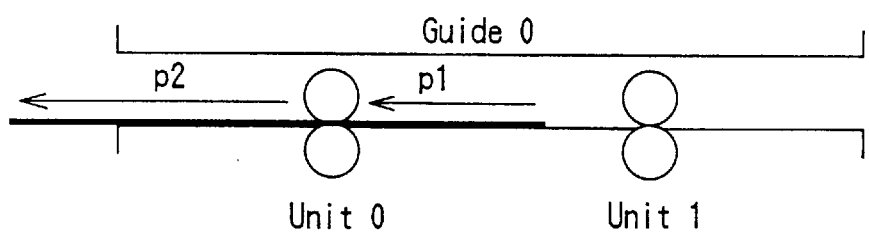
```
INFORMATION OF Paper 0
  BASIC MODELS : p0, p1
    INFORMATION OF p0 = handling 0 (INFORMATION OF p0)
    INFORMATION OF p1 = handling 0 (INFORMATION OF p1)
```

F I G. 39
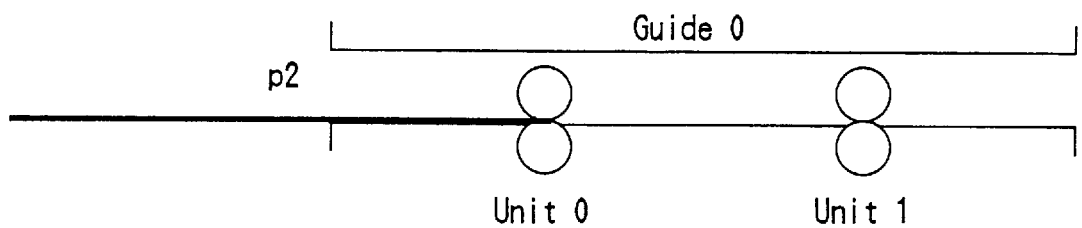
```
INFORMATION OF Paper 0
  BASIC MODEL  : p2
    INFORMATION OF p2
      COORDINATES OF OPPOSITE ENDS (xl2,yl2) (xr2,yr2)
      LENGTH length 2
      FLEXURE HEIGHT LIMIT g_height
```

SIMULATION SYSTEM FOR CONTROL SEQUENCE FOR SHEET TRANSPORTATION

BACKGROUND OF THE INVENTION

1. Field of the Invention

The present invention relates to a simulation system for simulating sheet transportation in a virtual manner to check how a sheet behaves in a sheet transportation device when the sheet transportation device is controlled on the basis of a formulated control sequence.

2. Description of the Related Art

In the field of image forming apparatuses such as a copying machine, a research and development has recently been conducted on self-diagnosis and self-repair functions utilizing artificial intelligence (AI) for maintenance automation.

The applicant of the present invention previously proposed a system for ensuring formation of a high quality image and, if the image quality is deteriorated, performing self-diagnosis and self-repair operations (for example, see Japanese Unexamined Patent Publication(KOKAI) No. 4-130331 (1992)).

In terms of the maintenance of the overall image forming apparatus, however, the prior art is not satisfactory which deals only with the image quality maintenance of formed images. Therefore, it is desirable to cover a wider range of objective functions for maintenance thereof.

In recent years, a need has arisen for feeding a multiplicity of sheets for the speeding up of the operation of a copying machine. The feeding of the multiplicity of sheets essentially requires improvement of the performance and stability of a sheet transportation system of the copying machine.

Unfortunately, most of presently available sheet transportation systems or mechanisms can handle only limited types of sheets made of specific materials, and can be used only in a specific operational environment because of their performance unstableness toward a change in the operational environment.

The sheet transportation system per se deteriorates with time due to the aging of components thereof, thereby often causing a sheet feeding failure (e.g., plural-sheet feeding, no-sheet feeding and sheet jam). When such a failure occurs, a typical approach to the functional maintenance of the system is the cleaning of the system or the replacement of a faulty component.

SUMMARY OF THE INVENTION

In view of the foregoing, the applicant of the present invention has conducted a research and development on a system adapted to perform self-diagnostics on sheet feeding and sheet transporting operations in a sheet transportation device and take preventive measures and countermeasures against faults resulting from an external interference such as a change in a sheet material, a use environment or the like or a time-related change of the device for maintenance of the device.

In the process of the research and development, the applicant found it impossible to check how a sheet is transported by means of a sheet transportation system, by using the real sheet transportation system along with the real sheet. Because if a sheet jam or a like sheet transportation failure occurs when the sheet transportation is observed on the real sheet transportation system, the operation of the device is stopped at this stage, making it impossible to perform a self-repairing operation.

The inventors of the present invention have developed a simulation system which is adapted to construct a virtual sheet transportation system in a computer on the basis of data obtained from a real sheet transportation system and perform a simulation in which a virtually defined sheet is transported in the virtual sheet transportation system to observe the behavior of the sheet without the use of the real sheet transportation system.

It is therefore an object of the present invention to provide a simulation system for simulating sheet transportation to check the behavior of a sheet to be transported by a transportation system.

It is a more specific object of the present invention to provide a simulation system for simulating sheet transportation to check how a sheet is to be transported in a real sheet transportation system having self-diagnosis and self-repair functions, when the system is controlled on the basis of a control sequence to take preventive measures or countermeasures against a fault for maintenance of the system.

In accordance with the present invention, there is provided a simulation system for simulating sheet transportation, upon receiving a control sequence formulated for a sheet transportation system, to check how a sheet is to be transported in the sheet transportation system on the basis of the applied control sequence. The simulation system comprises data extraction means for extracting necessary data from hardware systems constituting the real sheet transportation system, virtual sheet transportation system generation means for generating a virtual sheet transportation system in a computer on the basis of the data extracted by the data extraction means, sheet representation means for representing a sheet by information indicative of locations of opposite ends of the sheet and a distance therebetween, and transportation simulation implementation means for moving the sheet represented by the sheet representation means by a predetermined unit distance in the virtual sheet transportation system on the basis of the control sequence, and computing data for every movement of the sheet.

With this arrangement, the virtual sheet transportation system is constructed in the computer on the basis of the data extracted from the real sheet transportation system. The sheet is represented in a virtual manner by the information indicative of the locations of the opposite ends of the sheet and the distance therebetween. It can be checked how the sheet represented in a virtual manner behaves during the sheet transportation in the virtual sheet transportation system.

Thus, the sheet transportation can be checked when the sheet transportation system is controlled on the basis of the formulated control sequence without actually operating the real sheet transportation system on the basis of the control sequence. Therefore, the validity of the control sequence can be checked in the virtual sheet transportation system constructed in the computer. Accordingly, when a new control sequence is formulated for a fault preventive maintenance, the validity of the formulated control sequence can be checked promptly.

In accordance with one embodiment, the simulation system includes a graphical user interface, and the behavior of the sheet on the basis of the virtual sheet transportation performed by the transportation simulation implementation means is displayed by way of the graphical user interface.

The foregoing and other objects, features and effects will become apparent from the following description of the preferred embodiments with reference to the attached drawings.

BRIEF DESCRIPTION OF THE DRAWINGS

FIG. 2 is a schematic diagram illustrating the internal construction of a transportation-related unit;

FIG. 5 is a diagram for explaining the sheet path model stored in the knowledge base;

FIG. 6 is a diagram for explaining the sheet path model stored in the knowledge base;

FIG. 7 is a diagram for explaining a sensor model stored in the knowledge base;

FIG. 8 is a diagram for explaining the sensor model stored in the knowledge base;

FIGS. 10A and 10B are diagrams for explaining the sheet model stored in the knowledge base;

FIG. 11 is a diagram for explaining the state of the sheet model where a point is set in a driving mode;

FIG. 12 is a diagram for explaining the relationship between a lower point and an upper point;

FIG. 13 is a diagram for explaining a state to be possibly assumed by an interval;

FIG. 14 is a diagram illustrating the relationship between a real speed at a point and the state of an interval;

FIGS. 15A to 15D are diagrams for explaining a method for representing a sheet path model and a sheet model which are required for formulation of a control sequence;

FIGS. 18A and 18B are diagrams for explaining the qualitative specifications for the preparation of the zone shift sequence;

FIGS. 19A and 19B are diagrams for explaining the preparation of the zone shift sequence more specifically;

FIG. 21 is a diagram for explaining the prepared zone shift sequence in conjunction with the sheet path model;

FIGS. 22A and 22B are diagrams illustrating a sheet path model and a sheet model for explaining the formulation of the control sequence after the preparation of the zone shift sequence;

FIGS. 23A and 23B are diagrams illustrating qualitative specifications for explaining the formulation of the control sequence after the preparation of the zone shift sequence;

FIG. 26 is a functional block diagram of a simulation section;

FIG. 27 is a diagram illustrating a basic model of a sheet;

FIG. 28 is a diagram illustrating a model of a sheet restricted by units;

FIG. 29 is a diagram illustrating a model of a warped sheet;

FIG. 32 is a diagram for explaining sheet transportation in a virtual transportation system;

FIG. 33 is a diagram for explaining the sheet transportation in the virtual transportation system;

FIG. 35 is a diagram for explaining the sheet transportation in the virtual transportation system;

FIG. 38 is a diagram for explaining the sheet transportation in the virtual transportation system; and FIG. 39 is a diagram for explaining the sheet transportation in the virtual transportation system.

DETAILED DESCRIPTION OF THE PREFERRED EMBODIMENTS

1. Construction of Copying Machine according to the Present Invention

Figure 1:
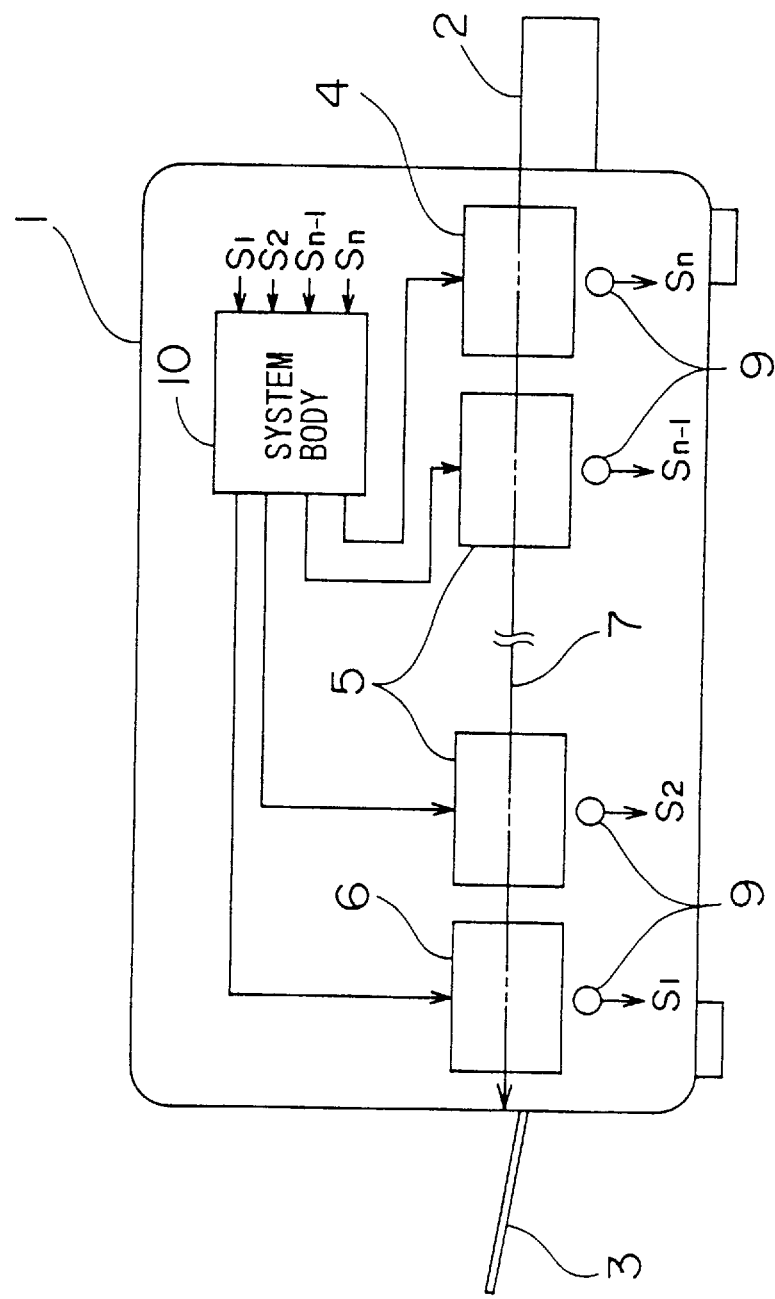
FIG. 1 is a diagram illustrating the internal construction of a copying machine to which one embodiment of the present invention is applied, the diagram schematically illustrating only major portions thereof relevant to the invention.

FIG. 1 is a conceptual diagram illustrating the construction of a copying machine to which one embodiment of the present invention is applied. In FIG. 1, only major portions thereof relevant to the invention are shown. The copying machine is adapted to automatically perform diagnostics to determine whether or not a faulty event occurs and, if it is determined that such a faulty event occurs, perform a repair operation. Exemplary faulty events include breakage of transportation-related units to be described later, remarkable deterioration of functions of the transportation-related units and a sheet jam.

The exterior of the copying machine is defined by a copying machine body 1. A sheet feeding cassette 2 accommodating copy sheets is detachably attached to one side of the copying machine body 1. A sheet discharge tray 3 for receiving copied sheets is detachably attached to the other side of the copying machine body 1.

Within the copying machine body 1 are provided a sheet supply unit 4 for taking in a copy sheet accommodated in the sheet feeding cassette 2, a plurality of sheet transportation units 5 for transporting the copy sheet introduced by the sheet supply unit 4, a sheet discharge unit 6 for discharging the sheet transported by the sheet transportation units 5 to the sheet discharge tray 3, which are disposed in this order along a transportation path 7. In the following description, the sheet supply unit 4, the sheet transportation units 5 and the sheet discharge unit 6 are referred to generally as "transportation-related units 8".

The transportation-related units 8 are each provided with a plurality of sensors 9 for sensing the current states of the transportation-related units 8. The outputs S1, S2, . . . , Sn-1, Sn of the sensors 9 are applied to a system body 10.

The system body 10 applies a control sequence to the transportation-related units 8 on the basis of the outputs of the sensors 9 to control the operations of the transportation-related units 8. More specifically, the system body 10 performs diagnostics on the current states of the transportation-related units 8 on the basis of the outputs of the sensors 9. If it is determined that any of the transportation-related units 8 is broken, that the function of any of the transportation-related units 8 is deteriorated, that there is a possibility to cause a sheet jam or that a sheet jam has occurred, the system body 10 applies to the transportation-related units 8 a control sequence for the repair of such a fault. The transportation-related units 8 which have received the control sequence operate in strict conformity with the control sequence.

It is noted that the copying machine herein employed is such that the sheet feeding cassette 2 and the sheet discharge tray 3 are attached to the right side and the left side, respectively, of the copying machine body 1 and the transportation path 7 is provided along a line extending from the right to the left as shown in FIG. 1. The present invention, however, is applicable, for example, to a copying machine in which the sheet feeding cassette 2 is provided in a lower portion thereof, the sheet discharge tray 3 is provided within the copying machine body 1 thereof and the transportation path 7 is not linear. The present invention can readily be applied to any variations of the sheet transportation system having transportation-related units 8 of different configurations or different numbers.

2. Configurations of Transportation-Related Units

FIG. 2 is a conceptual diagram illustrating the internal construction of each of the transportation-related units 8. The transportation-related units 8 each have a pair of rollers 11 for applying a transportation force to a copy sheet. A driving force of a motor 12 is transmitted to a shaft of one of the rollers via a clutch 81. The rotation speed and direction of the motor 12 are controlled by a control section 13. The control section 13 controls the operating conditions of the transportation-related unit 8 such as the rotation speed and direction of the motor 12 and the biasing condition of the rollers 11. The controlling operation is independently performed for each of the transportation-related units 8, which will be described later. More specifically, the respective transportation-related units 8 independently operate so that the copy sheet is transported from one transportation-related unit 8 to another transportation-related unit 8.

The control sequence from the system body 10 is applied to the control section 13. The control section 13 interprets the control sequence to control the rotation speed and direction of the motor 12 and the state of the rollers 11.

Thus, the control sequence applied from the system body 10 is interpreted to achieve the control of the rotating and biasing conditions of the rollers in the transportation-related unit 8. In addition to the control of the rotating and biasing conditions of the rollers, the transportation-related unit 8 autonomously performs a fault repairing operation. Therefore, even if the configuration of the transportation-related unit 8 is modified on a software basis or on a hardware basis, it is not necessary to change the basic functional configuration of the system body 11, thereby enabling the transportation-related unit 8 to flexibly accommodate the modification of the unit.

The number of the sensors 9 provided in association with the transportation-related unit 8 corresponds to the number of items to be sensed. For example, the sensors 9 sense whether or not a copy sheet is present at the entry and the exit of the rollers and whether or not the rollers smoothly rotate. Further, the sensors 9 sense the biasing state of the rollers 11, the amperage of the motor 12 and the like. The sensors apply signals indicative of the sensed states to the system body 10.

Although the pair of rollers 11 are herein employed as an actuator in the transportation-related unit 8, a transportation belt may be employed as the actuator which is capable of performing the sheet feeding operation, the sheet transporting operation and the sheet discharging operation.

3. Overall Construction Relating to System Body

Figure 3:
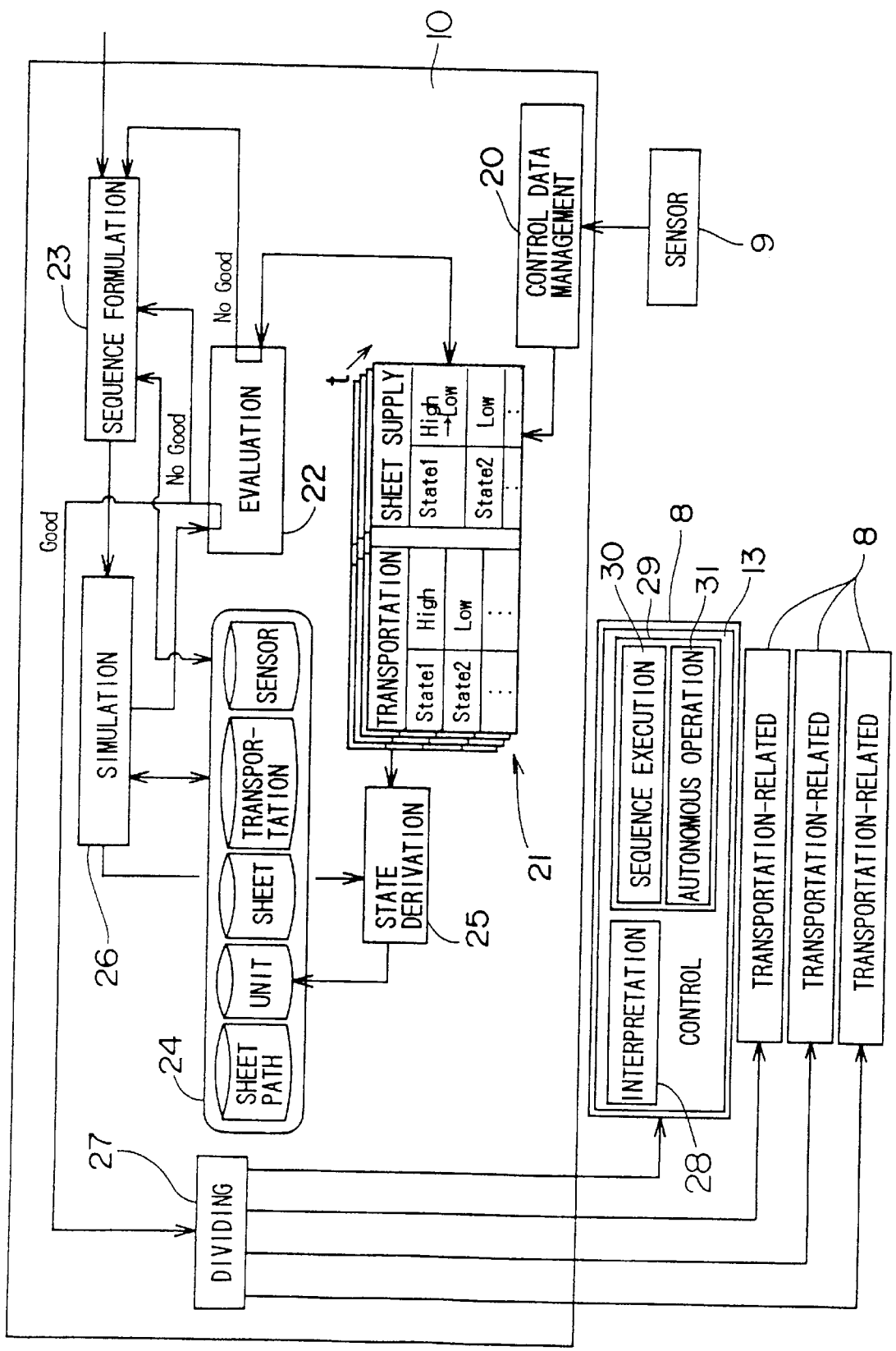
FIG. 3 is a functional block diagram illustrating the configuration of the copying machine relevant to the present invention.

FIG. 3 is a functional block diagram illustrating the internal constructions of the transportation-related units 8 and the system body 10. The system body 10 has a control data management section 20. The control data management section 20 writes information concerning the respective transportation-related units 8 into a data table 21 in a predetermined updating cycle on the basis of the signals from the sensors 9. More specifically, the states (STATE) of the respective transportation-related units 8 and sheet speeds (PAPER SPEED) at the respective transportation-related units 8 are written in the data table 21. Therefore, the data table 21 retains the current (latest) states of the respective transportation-related units 8.

In this embodiment, the data table 21 and a knowledge base to be described later correspond to the state storage means.

The system body 10 has an evaluation section 22. The evaluation section 22 performs diagnostics on the current state of each of the transportation-related units 8 on the basis of the information on the transportation-related units 8 written in the data table 21. More specifically, the evaluation section 22 determines whether or not any of the transportation-related units 8 is broken, whether or not the function of any of the transportation-related units 8 is deteriorated, whether or not there is a possibility to cause a sheet jam, and whether or not a sheet jam has occurred.

If the diagnostic result indicates that there is a possibility to cause a fault or that a fault has occurred (NO GOOD), the evaluation section 22 requests a sequence formulation section 23 to formulate a control sequence for repair of the fault.

In response to the request of the formulation of the control sequence from the evaluation section 22, the sequence formulation section 23 performs a control sequence formulation operation. At this time, the sequence formulation section 23 refers to the knowledge information written in the knowledge base 24 in the system body 10.

The knowledge base 24 will briefly be explained. The knowledge base 24 functions as the knowledge storage means, and stores therein virtual models as knowledge information required for the fault repair. More specifically, the knowledge base 24 stores therein a sheet path model, a unit model, a sheet model, a transportation path model and a sensor model. Among those, the sheet path model, the sheet model, the transportation path model and the sensor model are preliminarily defined. These models will be described in greater detail later.

The unit model is knowledge information corresponding to a difference between a state of the transportation-related unit 8 expected by the system body 10 and an actual state of the transportation-related unit 8 (e.g., deterioration of a component (rollers and the like) in the transportation-related unit 8). The unit model is constantly updated on the basis of data read out of the data table 21 by a state derivation section 25. In other words, the unit model is information indicative of a time-related change in the behavior of the transportation-related unit 8.

More specifically, the state derivation section 25 receives information on an ideal behavior of a control sequence presently executed by the transportation-related unit 8 from the simulation section 26. The state derivation section 25 determines a difference between the actual behavior information on the transportation-related unit 8 written in the data table 21 and the ideal behavior information, and writes information indicative of the difference as a unit model into the knowledge base 24.

The sequence formulation section 23 formulates a control sequence by using the knowledge information including the unit model. Thus, the current state of the transportation-related unit 8 can be taken into consideration for the formulation of the control sequence.

The control sequence formulated by the sequence formulation section 23 is a rough one which corresponds to a skeletal control sequence. Therefore, the control sequence is subjected to a transportation simulation which will be described later to provide an ultimate control sequence.

In addition to the request from the evaluation section 22, the sequence formulation section 23 receives a request for the formulation of a control sequence from the outside when control specifications such as a copy speed and a transportation procedure are changed. In such a case, the sequence formulation section 23 formulates a control sequence in the same manner as described above.

The control sequence formulated by the sequence formulation section 23 is applied to the simulation section 26.

The simulation section 26 simulates a sheet transportation operation in a virtual manner on the basis of the control sequence applied from the sequence formulation section 23. More specifically, the simulation section 26 specifies a transportation path and a sheet in a virtual manner on the basis of the sheet path model and the sheet model written in the knowledge base 24, and transports a virtual sheet along a virtual transportation path on the basis of the applied control sequence. At this time, the behavior of the virtual sheet is recognized by the simulation section 26. Further, the simulation section 26 obtains quantitative information such as PAPER SPEED and the like at the transportation-related unit 8, and reflects the quantitative information to the formulation of the control sequence. Thus, the formulation of the control sequence is completed.

The result of the transportation simulation performed in the simulation section 26 is applied to the evaluation section 22. The evaluation section 22 determines on the basis of the simulation result applied from the simulation section 26 whether or not the control sequence formulated by the sequence formulation section 23 is valid.

If the evaluation result indicates that it is impossible to properly perform the sheet transporting operation on the basis of the formulated control sequence and to repair the fault (NO GOOD), the evaluation section 22 requests the sequence formulation section 23 again to formulate a control sequence. If it is judged that the sheet transporting operation can properly be performed on the basis of the formulated control sequence for the fault repair (GOOD), the control sequence is applied to a dividing section 27.

In this embodiment, the evaluation section 22 and the sequence formulation section 23 correspond to the diagnosis means and the formulation means, respectively. The simulation section 26 and the evaluation section 22 correspond to the judgment means, and a combination of the evaluation section 22, the sequence formulation section 23 and the simulation section 26 corresponds to the sequence generation means.

The dividing section 27 divides the applied control sequence on a task basis, and the resulting control sequence segments are respectively applied to the corresponding transportation-related units 8. More specifically, since the control sequence is a time-series program, it is predicted that plural transportation-related units 8 are involved in the execution of the control sequence. Therefore, the control sequence segments are properly allocated to the transportation-related units 8 responsible for the execution of the control sequence.

Briefly, the system body 10 constantly monitors the overall sheet transportation system comprised of the plurality of transportation-related units 8 and, if there is a possibility to cause a transportation failure such as the slow-down of a sheet speed or a sheet jam or if such a transportation failure occurs, the system body 10 newly generates an improved control sequence for maintenance of the overall transportation system which is applied to the transportation-related units 8.

The control section 13 of the transportation-related unit 8 has a interpretation section 28. The interpretation section 28 interprets the control sequence applied from the system body 10 and applies the interpreted control sequence to a controllable self-repair section 29.

The controllable self-repair section 29 includes a sequence execution section 30. The sequence execution section 30 receives the control sequence applied from the interpretation section 28. The sequence execution section 30 controls the rotation speed and direction of the motor 12 (see FIG. 2) and the biasing state of the rollers 11 in strict conformity with the applied control sequence.

The controllable self-repair section 29 further includes an autonomous operation section 31 which serves to perform a repairing operation on the basis of its original program. The autonomous operation section 31 performs diagnostics on a fault independently of the control sequence applied from the system body 10, and performs a repairing operation on the fault. More specifically, the autonomous operation section 31 performs diagnostics on a fault such as an erroneous operation due to the aging of a component or an external interference, and repairs the fault.

Thus, when it is judged that there is a possibility to cause a fault or that a fault has occurred, the control sequence is formulated in consideration of the current states of the transportation-related units 8, and the transportation-related units 8 operate on the basis of the control sequence. Therefore, a dynamic repairing operation can be performed for the repair of the fault. This ensures the functional maintenance for the sheet feeding and transporting system.

Since the validity of the approach to the fault repair (control sequence) is evaluated not by actually performing a sheet transportation operation, but by performing the sheet transportation simulation, the fault repair can be achieved without interrupting the operations of the copying machine.

Further, the validity evaluation of the repair approach by the transportation simulation enables the copying machine to perform a flexible repair operation on an unidentified fault.

4. Method for Formulation of Control Sequence

The formulation of the control sequence will hereinafter be described in greater detail. First, an explanation will be given to the knowledge information written in the knowledge base 24. The knowledge information is indispensable for the formulation of the control sequence.

4-1. Knowledge Information 4-1-1. Sheet Path Model

Figure 4:
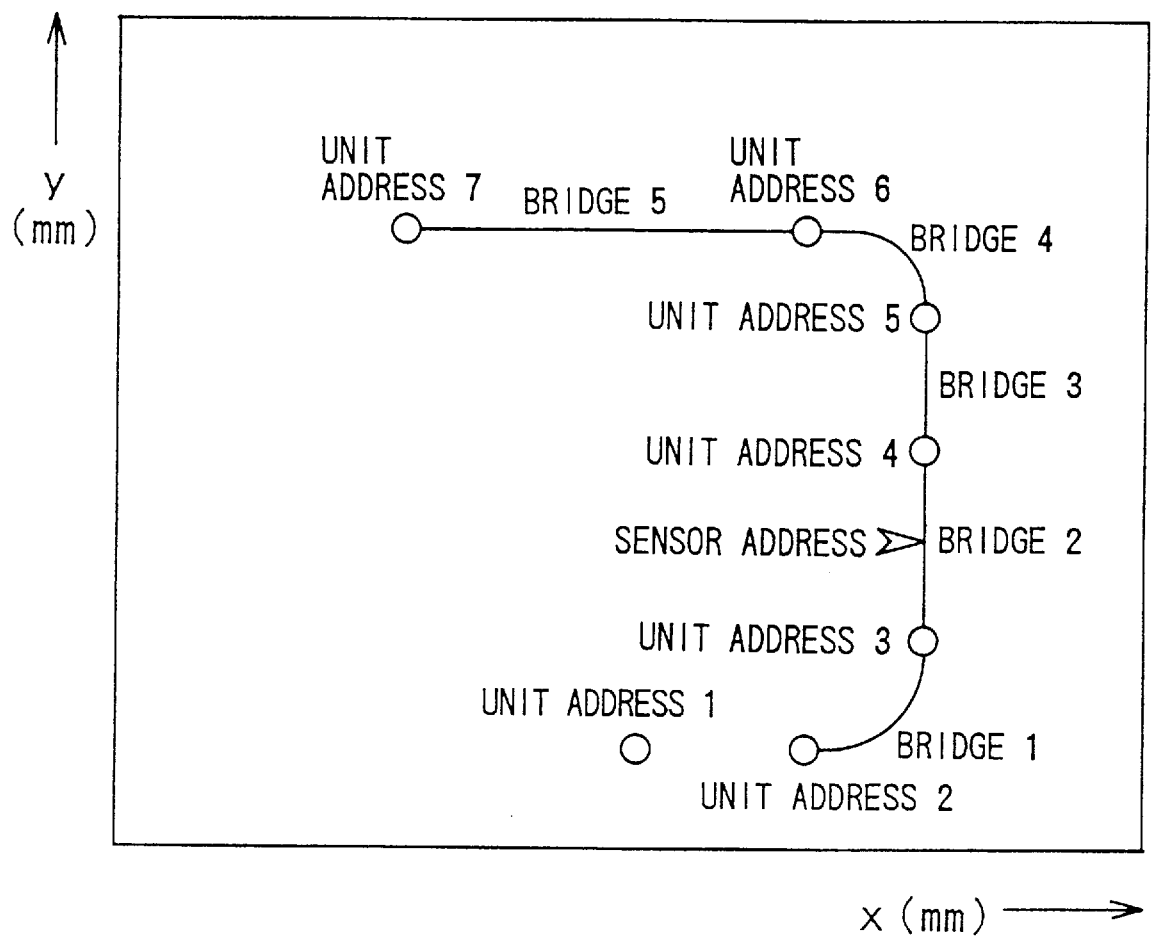
FIG. 4 is a diagram for explaining a sheet path model stored in a knowledge base.
Figure 9:
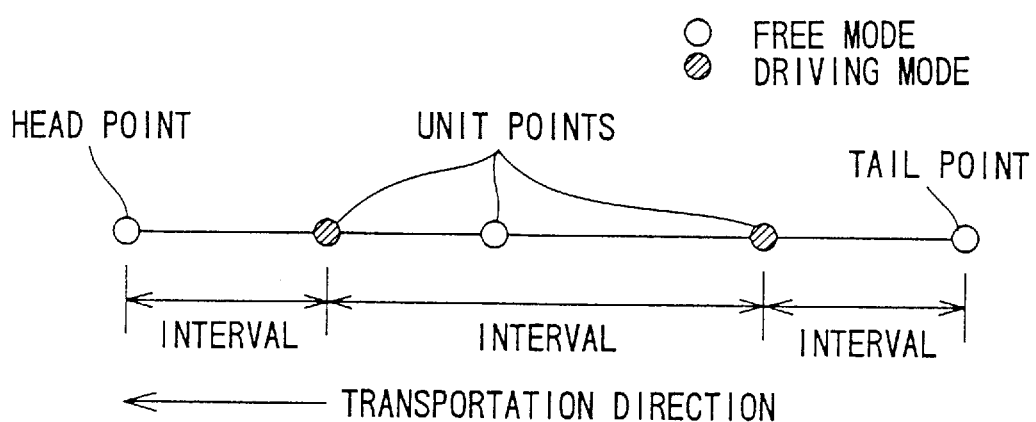
FIG. 9 is a diagram for explaining a sheet model stored in the knowledge base.

FIGS. 4 to 6 are diagrams for explaining the sheet path model. The sheet path model is represented as a quantitative map drawn in an x-y plane, and particular points on the map are each described by coordinates in the x-y plane and the like.

More specifically, the transportation path 7 (see FIG. 1) is represented as a line as shown in FIG. 4. The transportation-related units 8 disposed along the transportation path 7 are respectively represented as unit addresses on the line in accordance with the actual positions thereof. Further, the sensors 9 disposed along the transportation path 7 are respectively represented as sensor addresses on the line in accordance with the actual positions thereof. In the sheet path model, the location and address of one sensor are shown just for illustration. Each line linking two adjacent unit addresses is herein referred to as "bridge".

The unit addresses, the sensor address and the bridges thus represented are described as shown in FIG. 5. More specifically, the unit addresses are each described by coordinates in the x-y plane and the status thereof. For example, "Paper Supply Unit" means that the sheet supply unit 4 is incorporated, and "Paper Feed Unit" means that the sheet transportation unit 6 is incorporated. "No Unit" means that no unit is incorporated.

Similarly, the sensor address is described by coordinates in the x-y plane and the status thereof. More specifically, the status of the sensor address indicates whether or not a sensor 9 is incorporated and, if the sensor 9 is incorporated, the status indicates the type of the incorporated sensor 9.

The bridges are described in a manner different from the unit addresses and the sensor address. More specifically, the bridges are each described by connection points linked by the bridge, a connection form and the height of the bridge. The connection points each mean a unit address. The connection form means whether the bridge is linear or curved. The height means a bridge height which ensures smooth sheet transportation along the real transportation path without a sheet jam.

The description of the bridges will be explained in greater detail with reference to FIG. 6. The bridges are each represented by a pair of lines 40 and 41, i.e., an upper line and a lower line, connecting two adjacent unit addresses. The connection form of the bridge, if the bridge has a curved configuration, is described by a curvature radius R of an arc drawn in the middle between the pair of curved lines 40 and 41 in concentricity therewith. The height of the bridge corresponds to a spacing between the pair of curved lines 40 and 41. Briefly, it is assumed that a copy sheet is transported between the pair of curved lines 40 and 41.

4-1-2. Sensor Model

FIGS. 7 and 8 are diagrams for explaining the sensor model. As shown in FIG. 7, the sensor model is represented such that an electric digital signal is to be outputted in response to an external stimulative event with a predetermined time delay. The sensor model thus represented is described as shown in FIG. 8.

The designation of the sensor is indexed, and the time delay and the output signal level are preliminarily defined for each of different stimulative events. More specifically, if the stimulative event is "Paper Exist" which means that a copy sheet is present, an "H" level digital signal is outputted with a time delay of X (ms). If the stimulative event is "No Paper" which means that no sheet is present, an "L" level digital signal is outputted with a time delay of XX (ms).

4-1-3. Sheet Model

FIGS. 9 to 14 are diagrams for explaining the sheet model. The sheet model is represented by specific characteristic points on a copy sheet and an interval (or zone) between the points.

More specifically, the characteristic points on the sheet include a head point corresponding to a leading edge of the sheet, a tail point corresponding to a trailing edge of the sheet, and unit points at which transportation-related units 8 serving to apply a dynamic force to the sheet for the sheet transportation are located.

The unit points each assume either of two modes, i.e., a driving mode and a free mode in which a transportation force is not applied to the copy sheet. In the driving mode, the rollers 11 (see FIG. 2) in the transportation-related unit 8 are biased against each other with a predetermined nip pressure to be ready to apply a transportation force to the copy sheet. In the free mode, conversely, the biasing state of the rollers 11 is eliminated, so that the rollers cannot apply a transportation force to the copy sheet for the transportation of the sheet.

The interval is one factor representing the state of the copy sheet, and defines a zone between the head point or the tail point and a unit point in the driving mode in which a transportation force can be applied to the copy sheet. A unit point in the free mode is not herein taken into consideration. This is because the unit point in the free mode does not apply a transportation force to the copy sheet so that the state of the copy sheet is not influenced thereby.

The head point, the tail point and the unit points thus represented are described as shown in FIGS. 10A and 10B. More specifically, the head point and the tail point are each described by the designation of the point and a real speed corresponding to the speed of the copy sheet at the point as shown in FIG. 10A. The real speed is calculated from the rotational speed of the rollers 11 which is sensed, for example, by an encoder with the copy sheet brought in contact with the rollers 11 (see FIG. 2). The unit points are each described by the designation and mode of the point, the type of a transportation-related unit corresponding to the unit point, and a real speed at the unit point, as shown in FIG. 10B.

Where the unit point is in the driving mode, the unit point influences the state of the copy sheet. The influence may result in the following three states (see FIG. 11):

State 1: A force is applied in a positive direction.

State 2: A force is applied in a negative direction.

State 3: The sheet is fixed.

Where the driving mode is employed, it is necessary to specify which state is to be employed. In this sheet model, a parameter of "target speed" is used to represent the states as follows:

Target Speed>0→State 1

Target Speed<0→State 2

Target Speed=0→State 3

In the sheet model, as described above, the influence to be exerted on the sheet is changed by changing the mode of the unit point and, if the unit point is put in the driving mode, by changing the target speed.

When the copy sheet is influenced by the unit point, the influence is reflected to the interval. More specifically, since the interval is defined by two adjacent points, the state of the interval is changed by the influence exerted on the sheet by these two points.

In the sheet model, an upper point and a lower point respectively located upstream and downstream of the copy sheet in a sheet transportation direction are specified as shown in FIG. 12, and how the interval is influenced by the modes of these points and the target speeds at the points are also described.

As shown in FIG. 13, the state of the interval is represented on the basis of three standard representations, i.e., "N", "TEAR" and "BM", which mean a normal state, a tensile limit and a flexure limit, respectively. In FIG. 13, an interval state between "N" and "BM" is a slacked state, which is represented as "increase". An interval state between "N" and "TEAR" is a tensed state, which is represented as "decrease".

FIG. 14 is a diagram illustrating the relationships between the modes of the points, the target speeds at the points and the interval states. First, an explanation will be given to terms used in FIG. 14. "TVlower" and "TVupper" are a target speed at the lower point and a target speed at the upper point, respectively. "RVlower" and "RVupper" are a real speed at the lower point and a real speed at the upper point, respectively.

"IState" is the interval state. More specifically, "[N, TEAR]" indicates that the interval is in a state between "N" and "TEAR", i.e., in a tensed state "decrease". "[N, BM]" indicates that the interval is in a state between "N" and "BM", i.e., in a slacked state "increase". "[N, TEAR], N" indicates that the interval is in a state between "N" and "TEAR" including "N", and "[N, BM], N" indicates that the interval is in a state between "N" and "BM" including "N".

Next, the control sequence formulation process to be performed by the sequence formulation section 23 with reference to the knowledge information written in the knowledge base 24 will be explained with reference to FIGS. 15A to 25E.

The sequence formulation section 23 formulates a control sequence by utilizing the knowledge information stored in the knowledge base 24 in response to the request from the evaluation section 22 or from the outside, as described above.

4-2. Models to be Used for Formulation of Control Sequence

To formulate the control sequence, the sequence formulation section 23 simplifies the sheet path model and the sheet model written in the knowledge base 24 in the following manner for representation thereof. More specifically, the transportation path is represented as a line in a virtual manner as shown in FIG. 15A. At this time, the lengths between the respective unit addresses along the virtual transportation path are described as shown in FIG. 15B. The sheet model is overlaid on the virtual transportation path.

The information on the interval is described in slots of a table as shown in FIG. 15C. More specifically, the information on the interval includes a designation for identifying the interval, the point names of the upper point and the lower point and the state of the interval. The interval state corresponds to a concept which will be described later.

Further, information on the sheet model is described in slots of a table as shown in FIG. 15D. More specifically, the information on the sheet model includes the designation of a sheet corresponding to the size of the sheet, the point names of the head point and the tail point of the sheet, and the friction coefficient and the length of the sheet.

4-3. Conditions to be Satisfied by Formulated Control Sequence

The sequence formulation section 23 uses the virtual transportation path and the virtual sheet represented in the aforesaid manner to determine conditions to be satisfied for the formulation of the control sequence. More specifically, qualitative specifications are first determined. The qualitative specifications define indispensable conditions required to be satisfied for the formation of the control sequence, and are represented by an initial state of the sheet and a complete state of the sheet after the completion of the sheet transportation. The complete state of the sheet is properly defined. As required, the complete state to be determined may be such a state that the sheet is located upstream of the initial position of the sheet after the sheet transportation. If there is a possibility to cause a sheet jam, it may be preferred to transport the sheet in a direction opposite to a usual transportation direction for easy repair.

The initial state of the sheet is determined in the following manner. When the formulation of a control sequence is requested by the evaluation section 22, the position of the copy sheet in the real transportation path 7 (see FIG. 1) is determined which corresponds to a position in the virtual transportation path where the sheet model is to be located, with reference to the unit model stored in the knowledge base 24, and the initial state is determined such that the sheet model is located at this position. More specifically, since the unit model retains information concerning the current state of the transportation-related unit 8 written by the state derivation section 25, the current position of the copy sheet can be determined by referring to the information. Where the formulation of a control sequence is requested from the outside, the position of the copy sheet is determined which corresponds to a position where a copy sheet is in the sheet feeding cassette, and the initial state is determined such that the sheet model is located at this position.

Figures 16A, 16B:
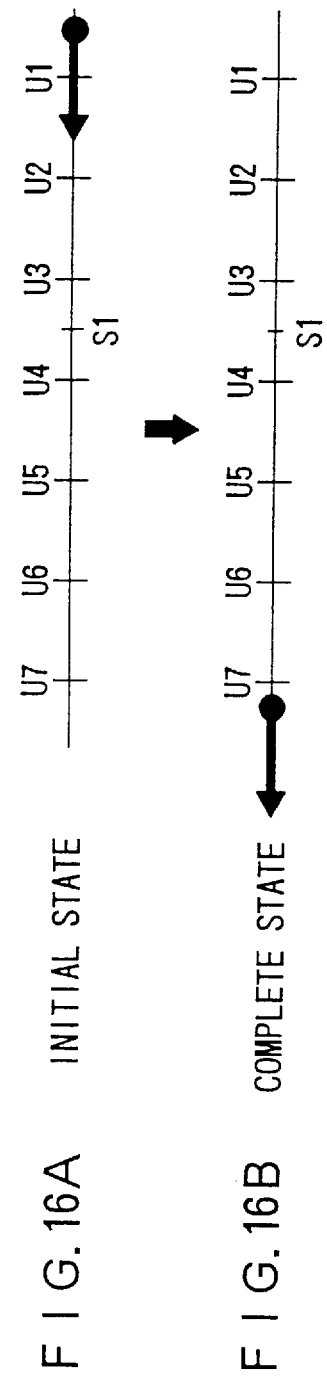
FIGS. 16A and 16B are diagrams for explaining qualitative specifications for the formulation of the control sequence.

The initial state and the complete state are represented by positional relationships between the leading edge of the virtual sheet and the respective points in the virtual transportation path. More specifically, where the initial state is such as shown in FIG. 16A, the initial state is described as follows:

Head Point: [U2, U1]

Tail Point: [U1, nil]

wherein [U1, nil] indicates that the point is located at a position upstream of the unit point U1 in the transportation direction.

Where the complete state is such as shown in FIG. 16B, the complete state is described as follows:

Head Point: [nil, U7]

Tail Point: [nil, U7]

wherein [nil, U7] indicates that the point is located at a position downstream of the unit point U7 in the transportation direction.

For the determination of the qualitative specifications, an additional condition is employed for the transportation of the virtual sheet. More specifically, the condition is such that at least one unit point in the driving mode is present in the sheet model.

Thus, the qualitative specifications are determined.

The sequence formulation section 23 determines quantitative specifications necessary for satisfying the qualitative specifications thus determined. The quantitative specifications are less strict conditions which are not necessarily satisfied when the control sequence is formulated. The quantitative specifications include a copy speed and the like.

Conditions to be satisfied by the sequence formulation section 23 include a predetermined concept in addition to the qualitative specifications and the quantitative specifications. The concept represents a state of a copy sheet which should be satisfied for execution of the control sequence. More specifically, the concept determines whether the copy sheet is to be transported in a normal state, in a tensed state or in a slacked state. The state of the copy sheet is described in the same manner as the state of the interval described in the aforesaid table, in which such expressions as "[N, TEAR], "[N, BM], N" and the like are used. The concept thus determined is described in slots of a table as shown in FIG. 15C.

The sequence formulation section 23 formulates the control sequence so as to satisfy the qualitative specifications, the quantitative specifications and the concept.

4-4. Preparation of Zone Shift Sequence

Next, a method for the formulation of the control sequence will be described in greater detail. First, an explanation will be given to the preparation of a zone shift sequence, which is the first stage of the formulation of the control sequence.

4-4-1. Model to be Used for Preparation of Zone Shift Sequence

Figures 17A, 17B:
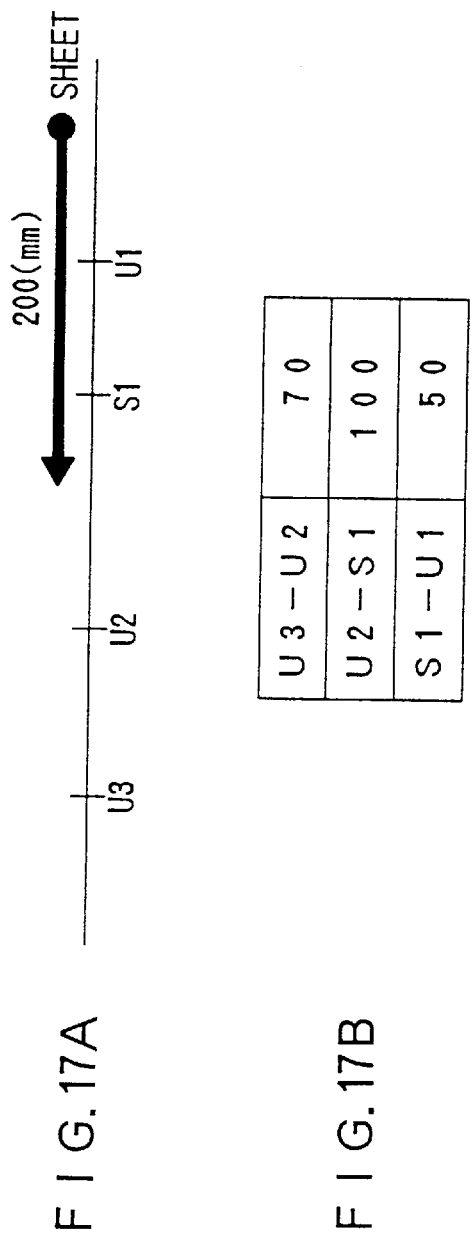
FIGS. 17A and 17B are diagrams illustrating a sheet path model and a sheet model for explaining a zone shift sequence preparation process to be carried out as part of the formulation of the control sequence.

A sheet path model represented by three unit addresses and one sensor address as shown in FIG. 17A is employed for simplification of explanation of the preparation of the zone shift sequence. At this time, the length of a virtual sheet is determined, and the lengths between the respective addresses are described as shown in FIG. 17B. It is assumed that the qualitative specifications are determined as shown in FIGS. 18A and 18B. More specifically, the qualitative specifications are described as follows:

[Initial State]
  Head Point: [S1, U1]
  Tail Point: [U1, nil]
[Complete State]
  Head Point: [nil, U3]
  Tail Point: [nil, Us]

4-4-2. Flow of Preparation of Zone Shift Sequence

On these premises, the sequence formulation section 23 lists up all possible combinations (hereinafter referred to as "frames") of zones where the head point and the tail points are possibly present, as shown in FIG. 19A. The upper line and the lower line in each frame correspond to the head point and the tail point, respectively. When the virtual sheet is transported along the virtual transportation path from the position defined by a given frame, any frames which possibly follow the given frame to define the zones where the head point and the tail point are to be located next are selected, and the given frame is networked with the selected frames. The frames are all subjected to this process. As a result, a network as shown in FIG. 19B is established.

Figures 20A, 20B:
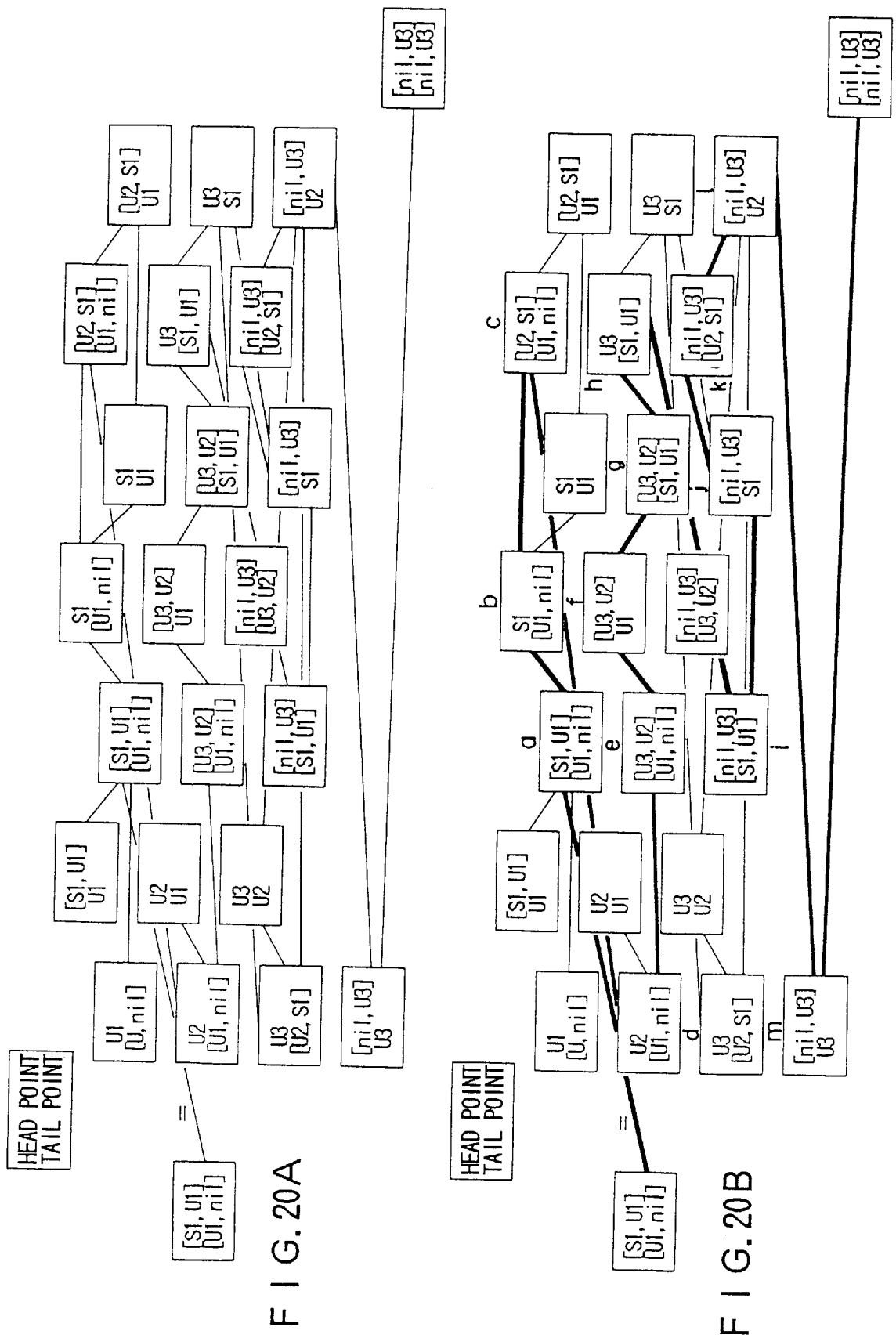
FIGS. 20A and 20B are diagrams for explaining the preparation of the zone shift sequence.

Thereafter, the initial state and the complete state are incorporated into the network as shown in FIGS. 20A and 20B to satisfy the qualitative specifications. More specifically, a frame having the same state as the initial state or a frame which possibly comes next to the frame corresponding to the initial state and defines the zones where the head point and the tail point are to be located next is selected, and the selected frame is related with the initial state. In the example shown in FIG. 20A, the frame corresponding to the initial state is selected. Then, a frame having the same state as the complete state or a frame which corresponds to a state preceding the complete state is selected, and the selected frame is related with the complete state. In the example shown in FIG. 20A, the frame corresponding to the state preceding the complete state is selected.

A combination of frames which provides the shortest way for the shift from the initial state to the complete state is searched for in the network shown in FIG. 20A. As a result, a combination of the frames "Initial State→a→b→ . . . →1 →m →Complete State" linked by bold lines as shown in FIG. 20B is selected, which possibly provides the shortest way. The combination of the frames is referred to as "zone shift sequence".

The zone shift sequence thus selected is represented as shown in FIG. 21 on the basis of time-related factors as well as the virtual transportation path and the virtual sheet.

4-5. Preparation of Control Sequence

Shift conditions required for shift from one frame to the next frame with time are determined for the zone shift sequence thus selected. More specifically, the shift conditions include a target speed to be determined when the mode of a unit point is specified or the unit point is put in the driving mode. The shift conditions thus determined are arranged on a time-series basis to form the control sequence.

4-5-1. Conditions to be Satisfied by Control Sequence to be Prepared

A process for determining the shift conditions will hereinafter be explained. Since the explanation may be complicated by using the model used for the explanation of the zone shift sequence preparation process (FIG. 17A), a sheet path model and a sheet model as shown in FIG. 22A are used which are simpler than those of FIG. 17A.

The sheet path model shown in FIG. 22A is represented only by three unit addresses U1, U2 and U3. Further, the sheet model has a length of 150 (mm). The lengths between the unit addresses U1 and U2 and between the unit addresses U2 and U3 are described as shown in FIG. 22B.

The qualitative specifications which define the initial state and the complete state are as shown in FIGS. 23A and 23B. That is, the qualitative specifications are described as follows:

[Initial State]
  Head Point: [U1, U2]
  Tail Point: [nil, U1]
[Complete State]
  Head Point: U3
  Tail Point: [U1, nil]

In the qualitative specifications, the unit point U1 is in the free mode in the initial state, and the unit points U1 and U2 are in the driving mode in the complete state.

Figure 24:
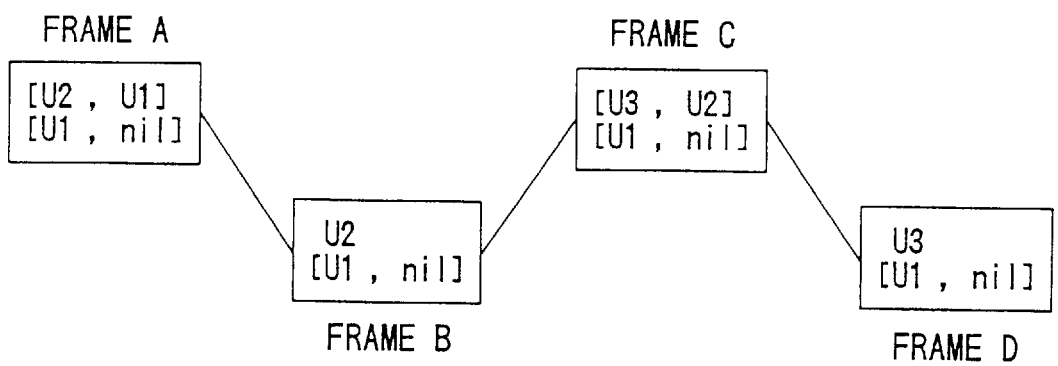
FIG. 24 is a diagram illustrating the zone shift sequence for explaining the formulation of the control sequence after the preparation of the zone shift sequence.

The quantitative condition and the concept are specified as "1 (sec)" and "Normal", respectively. As a result of the zone shift sequence preparation process thus performed, a zone shift sequence from a frame A to a frame D as shown in FIG. 24 is prepared.

4-5-2. Flow of Preparation of Control Sequence

On these premises, conditions required for the shift from the frame A to the frame B are considered. In the frame A, no point is in the driving mode and one interval is present between the head point and the tail point. Then, a unit point U1 located between the head point and the tail point is put in the driving mode. That is, the following shift condition is specified.

Unit Point 1: Driving mode

Figure 25A:
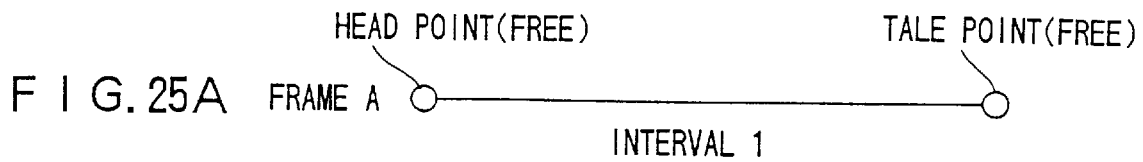
FIGS. 25A to 25E are diagrams for explaining the formulation of the control sequence after the preparation of the zone shift sequence.
Figure 25B:
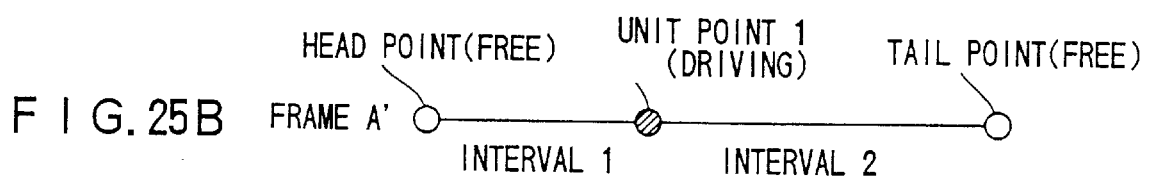

As a result, the frame A is shifted to a frame A' in which the unit point U1 in the driving mode is present between the head point and the tail point and two intervals 1 and 2 are present as shown in FIG. 25B.

Figure 25C:
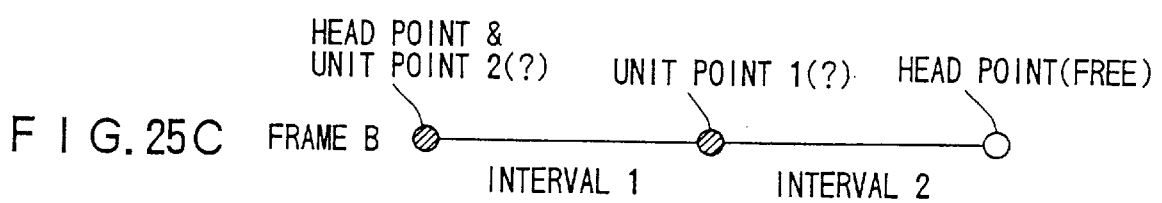

The frame A' is shifted to the frame B for the shift from the frame A to the frame B. More specifically, the head point in the frame A' is allowed to correspond to a unit point U2 as shown in FIG. 25C. This is apparently achieved by making the real speed of the head point positive in the frame A'.

As is apparent from the relationships between the modes of the points, the target speeds at the points and the interval states (part of the sheet model) shown in FIG. 14, the real speed RVH of the head point (the real speed at the lower point) is made positive by making the target speed TVU1 at the unit point U1 (the upper point) positive. More specifically, if TVU1=X (X>0), a condition for the shift from the frame A' to the frame B is specified as follows:

Unit Point 1: DRIVE PAPER(X)

When the frame A' is shifted on the basis of the shift conditions thus specified, the tail point can be moved without any inconsistency as will be apparent from the relationships shown in FIG. 14. Therefore, the shift from the frame A' to the frame B is ensured. Thus, the shift from the frame A to the frame B is completed.

The states of the points and the intervals in the frame A' are described on the basis of the relationships shown in FIG. 14 as follows:

Head Point: Real Speed=X
Unit Point 1: Real Speed=X
Tail Point: Real Speed=X
State of Interval 1: Normal
State of Interval 2: Normal Therefore, the concept is satisfied.

Figure 25D:
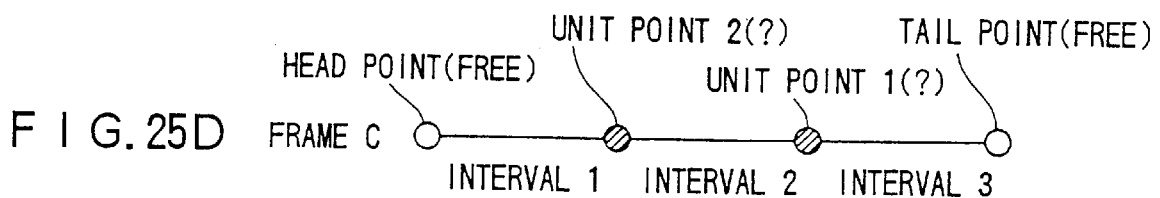

Next, the shift from the frame B to a frame C will be considered. The shift from the frame B to the frame C is achieved by moving the head point in the frame B to a position between a unit point U2 and a unit point U3. More specifically, the sheet model is represented as shown in FIG. 25D. To satisfy the conditions thus shown, the real speed RVH of the head point is made positive in the frame B. As is apparent from the relationships shown in FIG. 14, the target speed TVU2 at the unit point U2 is made positive to make the real speed RVH of the head point positive. For this, the target speed TVU2 is set to X (TVU2=X, X>0). However, an additional condition should be specified.

More specifically, the concept for the formulation of the control sequence is "Normal" as described above. This means that the state of the interval b corresponding to the zone between the unit points U1 and U2 should be kept "Normal". On the other hand, the target speed TVU1 at the unit point U1 for the shift from the frame A to the frame B is already set to X (X>0). Therefore, the target speed TVU2 of the unit point U2 should be specified such that the target speed TVU2 is always equal to the target speed TVU1 at the unit point U1. In other words, a time period during which TVU1 is not equal to TVU2 (TVU1≠TVU2) should be zero. Therefore, the target speed TVU2 should be set to X (TVU2=X) prior to or at the shift from the frame A to the frame B.

In view of the foregoing, the shift condition for the shift from the frame B to the frame C is specified as follows:

UNTIL (Head Point = Unit Point 2)
Unit Point 2: DRIVE PAPER(X)

The states of the points and the intervals in the frame B are described on the basis of the relationships shown in FIG. 14 as follows:

Head Point: Real Speed=X
Unit Point 1: Real Speed=X
Tail Point: Real Speed=X
State of Interval 1: Normal
State of Interval 2: Normal Therefore, the concept is satisfied.

Figure 25E:
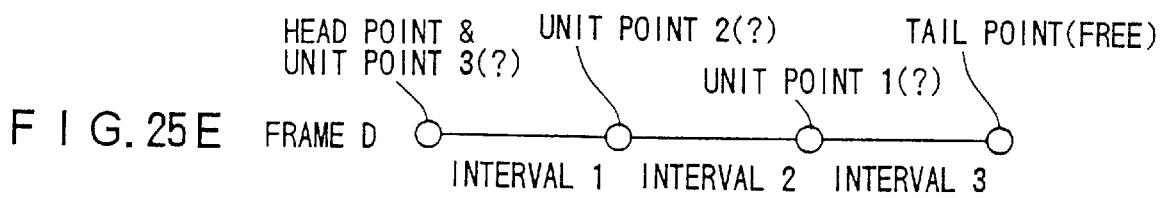

Next, the shift from the frame C to a frame D will be considered. The shift from the frame C to the frame D is achieved by moving the head point to a unit point U3 in the frame C. More specifically, the sheet model is represented as shown in FIG. 25E. To satisfy the conditions thus shown, the real speed RVH of the head point is made positive in the frame C. The target speed TVU2 at the unit point U2 (the upper point) is made positive to make the real speed RVH of the head point positive. However, the condition of TVU2=X (X>0) is already specified to satisfy the shift condition for the shift from the frame B to the frame C. Therefore, the shift from the frame C to the frame D can be achieved without specifying an additional shift condition.

The states of the points and the intervals in the frame C are described on the basis of the relationships shown in FIG. 14 as follows:

Head Point: Real Speed=X
Unit Point 1: Real Speed=X
Unit Point 2: Real Speed=X
Tail Point: Real Speed=X
State of Interval 1: Normal
State of Interval 2: Normal
State of Interval 3: Normal Therefore, the concept is satisfied.

The shift conditions for the shift from the frame A to the frame D are collectively shown below:

Unit Point 1: Driving mode
Unit Point 1: DRIVE PAPER(X)
UNTIL (Head Point = Unit Point 2)
Unit Point 2: DRIVE PAPER(X)

The sequence of the shift conditions thus prepared serves as the control sequence.

As described above, the control sequence formulated by the sequence formulation section 23 serves as a skeletal control sequence. This is attributed to the fact that the speed X is indeterminable and, therefore, the timing defined by "Until (Head Point=Unit Point 2)" is indeterminable. These factors are determined by the transportation simulation performed by the simulation section 26 as previously described.

5. Construction and Operation of Simulation Section

The construction and operation of the simulation section 26 will next be explained.

The characteristic functions of the simulation section 26 are to obtain information indicative of the characteristic constructions and behaviors of the respective devices constituting the real transportation system and the sheet from hardware systems such as the knowledge base 24 and inputted data, and to generate a virtual transportation system in the computer (simulation section). The sheet transportation is simulated by independently or interactively operating respective virtual components to check how the sheet is to be transported.

FIG. 26 is a functional block diagram of the simulation section 26.

Referring to FIGS. 26 and 3, the simulation section 26 has a transportation simulation implementing section 261 which generates components of the virtual sheet transportation system therein to construct the virtual sheet transportation system, mainly based on the knowledge information stored in the knowledge base 24. The control sequence inputted from the sequence formulation section 23 is applied to the transportation simulation implementing section 261. Information (transportation system information and transportation system operation data) necessary for the real transportation system is applied from the knowledge base 24, and inputted into the transportation simulation implementing section 261.

The transportation simulation implementing section 261 generates a possible result of a transportation operation to be realized by autonomous operations of one or more of the transportation system components including transportation devices such as the sheet supply unit, the transportation units, the sensors and transportation guides on the basis of the applied control sequence, the transportation system information and the transportation system operation data. The result is outputted as data indicative of the state of the sheet to the evaluation section 22. Where the simulation section 26 has a graphical user interface (GUI) 262, the behavior of the sheet is displayed by way of the GUI 262 for ready understanding thereof.

The transportation system information applied from the knowledge base 24 to the transportation simulation implementing section 261 is limited to information required for the implementation of the virtual transportation. The transportation simulation implementing section 261 can generate objects such as the transportation units and the sheet in a required number depending on the construction of the real transportation system.

The simulation section 26 defines the sheet, the sheet supply unit, the transportation units, the sensors and the transportation guides as independent objects, and the transportation is implemented by allowing these objects to act independently or interactively. Thus, even if the number or kinds of the objects constituting the transportation system are changed, the simulation section 26 can accommodate the changes to construct the virtual transportation system for flexible simulation of the transportation operation.

6. Definition of Sheet

The definition of the sheet among the objects in the virtual transportation system is significant. For correct derivation of the state of the sheet in the simulation, it is obvious that the state of the real sheet should faithfully be defined in the computer. However, this requires a greater amount of information to complicate the process, and entails an inconvenience such that incorrect information may have to be handled. To cope with this, the simulation section 26 specifies a sheet model such that only the characteristic features of the sheet relevant to the transportation system can be represented.

More specifically, the simulation section 26 represents the sheet as a basic sheet model by information indicative of the locations of the opposite ends of the sheet and the distance therebetween as shown in FIG. 27. Therefore, the sheet restricted by the transportation units is defined as a set of basic models delimited by the respective transportation units as shown in FIG. 28.

Figure 30:
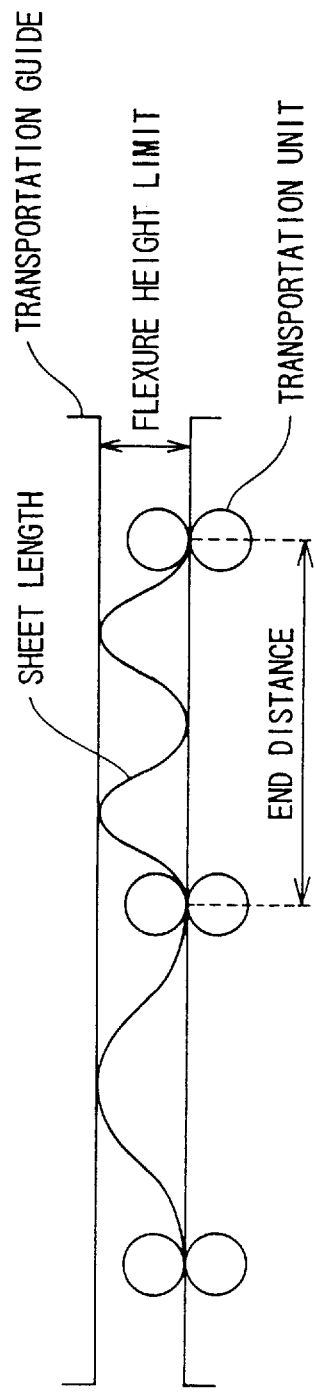
FIG. 30 is a diagram for explaining factors determining the flexure of the sheet.

In FIG. 27, the sheet is warped if a condition of "length $> \sqrt{\{(xr-xl)2+(yr-yl)2\}}$" is satisfied. The basic model of the warped sheet is defined as having a configuration including arcs of a fixed curvature radius as shown in FIG. 29. The flexure configuration of the sheet is determined by calculating the curvature radius of the arcs on the basis of the distance between the opposite ends of the sheet and the length of the sheet. The flexure stress of the sheet is derived from the curvature radius thus calculated.

Where a transportation guide is included as an object constituting the transportation system, the sheet is restricted by a flexure height limit. In such a case, the sheet should satisfy the conditions of the flexure height limit as well as the sheet end distance and the sheet length. The condition of the flexure height limit is taken into consideration when the flexure configuration is derived. Thus, the number of flexures and the curvature radius of each of the flexures are determined as shown in FIG. 30.

7. Implementation of Simulation

In the simulation performed by the simulation section 26, the sheet transportation operation is realized by information transmission between the plurality of objects constituting the transportation system.

Figure 31:
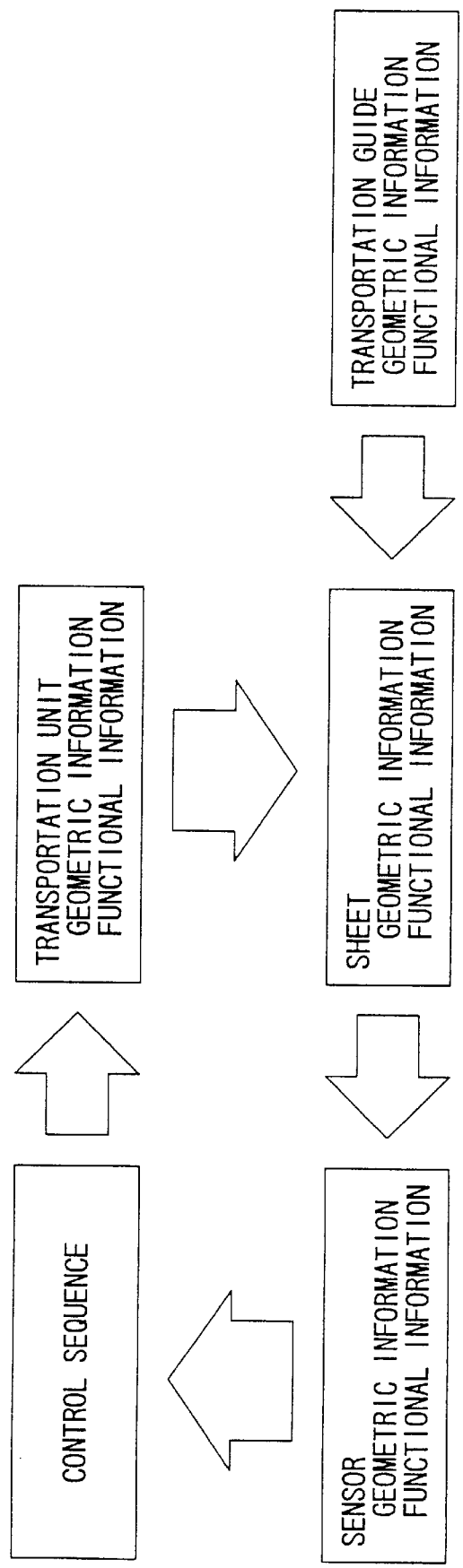
FIG. 31 is a diagram for explaining a method for information transmission between objects in a sheet transportation system.

The control sequence (operation program) is applied from the sequence formulation section 23 to the virtual transportation units as shown in FIG. 31. The transportation units each apply information to the virtual sheet on the basis of geometric information and functional information retained in the units. The sheet also receives geometric information and functional information from the virtual transportation guide. Information indicative of the behavior of the sheet based on the information from the transportation units and the transportation guide is applied to virtual sensors. The virtual sensors each apply information to the control sequence, so that the skeletal control sequence is fleshed out with the information.

For more specific explanation, it is herein assumed that the transportation system to be simulated includes one sheet to be transported, two transportation units and a transportation guide as objects. In the simulation section 26, a virtual transportation system as shown in FIG. 32 is constructed in the computer (an arithmetic unit in the simulation section 26).

The objects each extract necessary information from the real transportation system. That is, the objects each acquire necessary information from the knowledge base 24. The sheet retains information indicative of the coordinates of the opposite ends thereof and the length thereof. The transportation units each retain the coordinates of an operation point thereof and a function at the operation point.

Upon completion of the construction of the virtual transportation system, all the objects are ready to operate. When the simulation is started, the transportation units each search for a sheet to which information can be applied. The sheet which has received the information is segmented into basic models (see FIG. 27) delimited by the operation points of the transportation units.

The transportation guide also searches for a sheet to which information can be applied, and then applies the information to the sheet.

The simulation progresses from a state as shown in FIG. 32 to a state as shown in FIG. 33. In FIG. 33, a sheet Papaer0 having received the information from a transportation unit Unit1 and a transportation guide Guide0 is segmented into basic models p0 and p1, which each acquire information indicative of an action "handling1()" and a flexure height limit.

Figure 34:
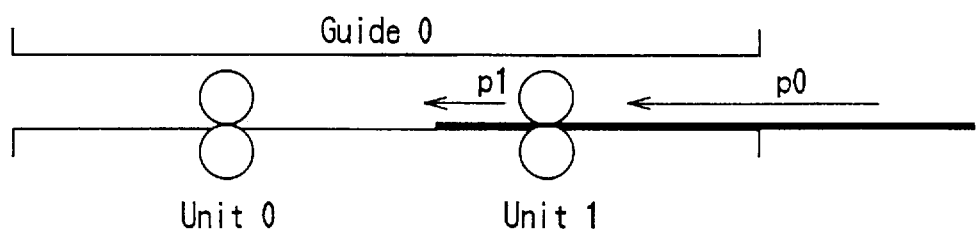
FIG. 34 is a diagram for explaining the sheet transportation in the virtual transportation system.

The sheet transportation is realized by updating the information on the sheet based on the applied action on the sheet. The simulation progresses from the state shown in FIG. 33 to a state as shown in FIG. 34. In FIG. 34, the basic models p0 and p1 receive actions from the units Unit1 and Unit2, respectively, for the update of the information.

FIG. 35 shows a state where an additional transportation unit Unit0 acts on the sheet. This state indicates that a new basic model p2 is added.

Figure 36:
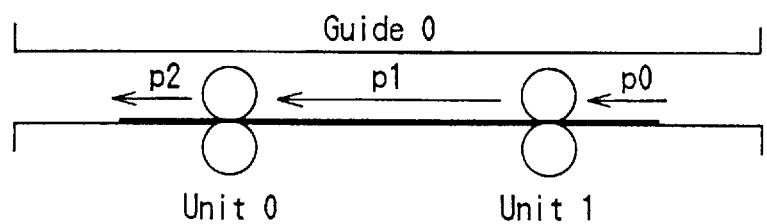
FIG. 36 is a diagram for explaining the sheet transportation in the virtual transportation system.

Thereafter, the basic model p2 receives an action from the unit Unit0, the basic model p1 receives actions from the units Unit0 and Unit1, and the basic model p0 receives an action from the unit Unit1, as shown in FIG. 36. Thus, the information on the sheet is updated.

Figure 37:
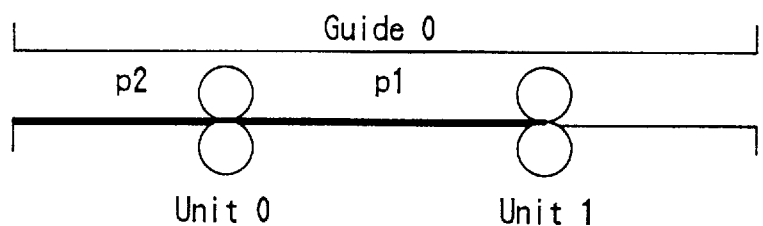
FIG. 37 is a diagram for explaining the sheet transportation in the virtual transportation system.

FIG. 37 shows a state where the two units Unit0 and Unit1 initially act on the sheet and then the single unit Unit0 acts on the sheet.

FIG. 38 shows a state where the sheet models p2 and p1 each receive an action from the unit Unit0, whereby the information on the sheet is updated.

FIG. 39 shows a state where the sheet receives no information from any of the transportation units at last. At this time, the sheet has only one sheet model retaining no information on an action.

As described above, the virtual transportation system is constructed with the use of a plurality of objects, and the virtual transportation operation is represented by information transmission between the objects in the simulation section 26. The sheet is defined by the minimum information required for the transportation. Therefore, the behavior of the sheet being transported can be derived with the use of a small-scale computing system.

Further, since the objects constituting the transportation system are independently handled, the specifications of the respective objects can readily be modified and an additional object can readily be introduced. Even if the specifications of the transportation-related units 8 (see FIG. 3) are changed, the sheet behavior simulation can readily be performed.

8. Miscellaneous

While the embodiment of the present invention has thus been described, it should be understood that the present invention is not limited to the aforesaid embodiment. For example, although the system body 10 is provided within the copying machine body in the aforesaid embodiment, the system body 10 may be provided as a discrete device outside the copying machine body. With such an arrangement, the interior construction of the copying machine body can be simplified.

In the aforesaid embodiment, the present invention is applied to the copying machine, but may be applied to any other apparatuses such as a printer and a facsimile machine which have a sheet feeding and transporting system.

Although the present invention has been described in detail by way of an embodiment thereof, it should be understood that the foregoing disclosure is merely illustrative of the technical principles of the present invention but not limitative of the same. The spirit and scope of the present invention are to be limited only by the appended claims.

This application is based on the application No. 8-126159 filed in Japan, the entire disclosure of which is incorporated hereinto by reference.

What is claimed is:

1. A simulation system for a control sequence for a sheet transportation system, which is adapted to simulate sheet transportation, upon receiving a control sequence formulated for the sheet transportation system, to check how a sheet is to be transported in the sheet transportation system on the basis of the applied control sequence, the simulation system comprising:

data extraction means for extracting necessary data from hardware systems constituting the real sheet transportation system;

virtual sheet transportation system generation means for generating a virtual sheet transportation system in a computer on the basis of the data extracted by the data extraction means;

sheet representation means for representing a sheet by information indicative of locations of opposite ends of the sheet and a distance therebetween; and transportation simulation implementation means for moving the sheet represented by the sheet representation means by a predetermined unit distance in the virtual sheet transportation system on the basis of the control sequence.

2. A simulation system as set forth in claim 1, further comprising a graphical user interface for displaying behavior of the sheet on the basis of virtual sheet transportation performed by the transportation simulation implementation means.

3. A simulation system as set forth in claim 1, wherein the virtual sheet transportation system generation means defines as objects a plurality of components constituting the transportation system;

wherein the sheet representation means defines as an object the sheet to be transported; and wherein the transportation simulation implementation means simulates the sheet transportation by allowing the objects to act independently or interactively.

4. A simulation system as set forth in claim 1, wherein the sheet representation means represents a portion of the sheet restricted between a pair of restriction points by components of the transportation system on the basis of a distance between the pair of restriction points and a length of the portion of the sheet restricted between the pair of the restriction points.

5. A simulation system as set forth in claim 4, wherein, if the length of the portion of the sheet restricted between the restriction points is greater than the distance between the restriction points, the sheet representation means represents a flexure of the portion of the sheet restricted between the restriction points by one or more arcs each having a given curvature radius.

6. A simulation system as set forth in claim 5, wherein the transportation system has a transportation guide defining a path of the sheet, and wherein the sheet representation means computes the number of flexures of the portion of the sheet restricted between the restriction points and configuration of the flexures by taking into consideration a flexure height limit of the sheet within the transportation guide.

* * * * *